United States Patent
Lee et al.

(10) Patent No.: US 11,012,878 B2
(45) Date of Patent: May 18, 2021

(54) BEAM MEASURING AND REPORTING METHOD AND BASE STATION AND USER EQUIPMENT USING THE SAME

(71) Applicant: Industrial Technology Research Institute, Hsinchu (TW)

(72) Inventors: Chien-Min Lee, Taoyuan (TW); Li-Chung Lo, Taichung (TW); Tsung-Hua Tsai, Kaohsiung (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 15/940,981

(22) Filed: Mar. 30, 2018

(65) Prior Publication Data

US 2018/0288645 A1  Oct. 4, 2018

Related U.S. Application Data

(60) Provisional application No. 62/478,616, filed on Mar. 30, 2017.

(30) Foreign Application Priority Data

Feb. 14, 2018 (TW) .................. 107105432

(51) Int. Cl.
H04B 7/06 (2006.01)
H04B 7/0456 (2017.01)
(Continued)

(52) U.S. Cl.
CPC .......... *H04W 24/10* (2013.01); *H04B 7/0404* (2013.01); *H04B 7/0478* (2013.01);
(Continued)

(58) Field of Classification Search
CPC ... H04B 7/0639; H04B 7/0456; H04L 5/0051; H04W 24/10; H04W 74/0833
(Continued)

(56) References Cited

U.S. PATENT DOCUMENTS 9,137,698 B2  9/2015 Li et al.
9,362,997 B2  6/2016 Kim et al.
(Continued)

FOREIGN PATENT DOCUMENTS

CN  101689901  11/2012
CN  104937972  9/2015
(Continued)

OTHER PUBLICATIONS

"Office Action of Taiwan Counterpart Application", dated Oct. 5, 2018, p. 1-p. 9.
(Continued)

*Primary Examiner* — Iqbal Zaidi
(74) *Attorney, Agent, or Firm* — JCIPRNET

(57) ABSTRACT

A beam measuring and reporting method adapted for a user equipment for a multibeam wireless communication system is provided. The method includes the following. A beam configuration for a plurality of first candidate beams is received. A channel measurement for each of the first candidate beams is performed in response to receiving the beam configuration. Beam information of at least one selected beam of the first candidate beams is reported in response to receiving the beam configuration.

34 Claims, 19 Drawing Sheets

(51) Int. Cl.
*H04B 7/0404* (2017.01)
*H04W 72/14* (2009.01)
*H04W 24/10* (2009.01)
*H04B 17/309* (2015.01)
*H04B 17/382* (2015.01)

(52) U.S. Cl.
CPC ......... *H04B 7/0626* (2013.01); *H04B 7/0695* (2013.01); *H04B 17/309* (2015.01); *H04B 17/382* (2015.01); *H04W 72/14* (2013.01)

(58) Field of Classification Search
USPC .......................... 370/252–339; 455/436–522
See application file for complete search history.

(56) References Cited

U.S. PATENT DOCUMENTS

| | | | |
|---|---|---|---|
| 9,407,346 B2 | 8/2016 | Chen et al. | |
| 2015/0341092 A1 | 11/2015 | Park et al. | |
| 2016/0013838 A1 | 1/2016 | Zhu et al. | |
| 2016/0323029 A1 | 11/2016 | Cheng et al. | |
| 2017/0006593 A1 | 1/2017 | Liu | |
| 2017/0026938 A1 | 1/2017 | Onggosanusi et al. | |
| 2018/0102826 A1* | 4/2018 | Raghavan | H04B 7/0621 |
| 2018/0138950 A1* | 5/2018 | Rahman | H04B 7/0417 |
| 2018/0249453 A1* | 8/2018 | Nagaraja | H04W 48/20 |

FOREIGN PATENT DOCUMENTS

| | | |
|---|---|---|
| CN | 106685496 | 5/2017 |
| EP | 3101971 | 12/2016 |
| TW | 201711403 | 3/2017 |
| WO | 2016023227 | 2/2016 |
| WO | 2016044994 | 3/2016 |
| WO | 2016179804 | 11/2016 |

OTHER PUBLICATIONS

Samsung, "Rx beam mode for beam management," 3GPP TSG RAN WG1 Nr Ad Hoc, R1-1700917, Jan. 16-20, 2017, pp. 1-3.
Samsung, "Beam management for DL control channel," 3GPP TSG RAN WG1 NR Ad Hoc, R1-1700918, Jan. 16-20, 2017, pp. 1-3.
Nokia, Alcatel-Lucent Shanghai Bell, "Beam Management—Beam Reporting," 3GPP TSG RAN WG1 NR Ad-Hoc Meeting, R1-1701091, Jan. 16-20, 2017, pp. 1-3.
Ericsson, "CSI feedback for beam management," 3GPP TSG-RAN WG1 #87ah-NR, R1-1700764, Jan. 16-20, 2017, pp. 1-4.
Panasonic, "Beam management and subcell," 3GPP TSG RAN WG1 NR adhoc, R1-1700538, Jan. 16-20, 2017, pp. 1-4.
Intel Corporation, "On Beam State Reporting," 3GPP TSG RAN WG1 NR Ad-Hoc Meeting, R1-1700346, Jan. 16-20, 2017, pp. 1-6.
"Office Action of China Counterpart Application", dated Nov. 26, 2020, p. 1-p. 9.

* cited by examiner

BEAM MEASURING AND REPORTING METHOD AND BASE STATION AND USER EQUIPMENT USING THE SAME

CROSS-REFERENCE TO RELATED APPLICATION

This application claims the priority benefits of U.S. provisional application Ser. No. 62/478,616, filed on Mar. 30, 2017, and Taiwan application serial no. 107105432, filed on Feb. 14, 2018. The entirety of each of the above-mentioned patent applications is hereby incorporated by reference herein and made a part of this specification

TECHNICAL FIELD

The disclosure relates to a beam measuring and reporting method and a base station and user equipment using the same.

BACKGROUND

Since the next-generation communication system (e.g., the 5G system) needs to offer better performance, some aspects of the next-generation communication system may require significant refinement. High-frequency millimeter waves (mmWave) may provide a greater wireless capacity and a higher speed for the next-generation wireless communication system. The mmWave system operates at a higher carrier frequency, and therefore the electromagnetic waves may suffer from a more significant path loss during propagation. For example, the attenuation of the electromagnetic waves around the frequency range of mmWaves is more significant than the attenuation of those around the frequency range of microwaves. Therefore, beamforming is required for transmission of the mmWave within the frequency range thereof.

To concentrate the radiation energy in a specific direction, beams in the mmWave wireless communication system has a narrower field-of-view (FoV) coverage. Therefore, to have a more complete coverage, a multi-input multi-output (MIMO) system may be adopted. As shown in FIG. 1, FIG. 1 is a schematic diagram illustrating a coverage of beams of a multibeam wireless communication system. A base station (BS) 110 shown in FIG. 1 has a plurality of mmWave beams 100, and each of the mmWave beams 100 has a different coverage. The coverage of each of the mmWave beams 100 is relatively narrow. Thus, as a user equipment (UE) 130 moves, the BS 110 needs to adaptively switch transmission and/or reception beams to communicate with the UE 130. As shown in FIG. 1, among the respective mmWave beams 100 of the BS 110, energy of beams 104 and 105 are concentrated in a direction in which the UE is located. Therefore, compared with other beams, the beams 104 and 105 may render a relatively desirable communication quality.

To find out a beam with a desirable quality, the beams are measured, and measurement results are reported. In FIG. 1, the UE 130 may respectively perform beam measurements for the beams 100 of the BS 110 and report measurement results to the BS 110. Specifically, the UE 130 may respectively receive the respective beams 100 and perform the beam (or channel) measurements for the respective beams 100 to obtain the measurement results corresponding to the respective beams 100. Then, among the beams 100, the UE 130 chooses one or more beams whose measurement results are more desirable to be selected beams, and reports beam identifiers (ID) and the measurement results of the selected beams to the BS 110 through a payload in a physical uplink control channel (PUCCH), for example. Accordingly, the BS 110 may schedule transmission resources for the selected beams selected by the UE 130.

In general, the number of the selected beams selected by the UE may variable, so the data size of the measurement results reported by the UE is also variable. For example, the UE 130 may only report the measurement result of the beam 105 to the BS 110 and may suggest the BS 110 that the beam 105 may be selected to communicate with the UE 130. Alternatively, the UE 130 may report the measurement results of the beams 104 and 105 together to the BS 110 and may recommend the BS 110 that at least one of the beams 104 and 105 may be selected to communicate with the UE 130. Since the maximum payload size of an uplink channel (e.g., PUCCH) may be fixed, the measurement results of the selected beams that the UE needs to report may exceed the maximum payload size of the PUCCH, making the UE unable to completely report the selected beam information to the BS through a single PUCCH.

Therefore, the beam measuring and reporting method needs to deal with the variable data size of the beam measurement result reported by the UE.

SUMMARY

Accordingly, the disclosure involves a beam measuring and reporting method and a base station and user equipment using the same.

An embodiment of the disclosure provides a beam measuring and reporting method adapted for a user equipment of a multibeam wireless communication system. The method includes the following. A beam configuration for a plurality of first candidate beams is received. A channel measurement for each of the first candidate beams is performed in response to receiving the beam configuration. Beam information of at least one selected beam of the first candidate beams is reported in response to receiving the beam configuration.

An embodiment of the disclosure provides a beam measuring and reporting method adapted for a base station of a multibeam wireless communication system. The method includes the following. A beam configuration for a plurality of first candidate beams is transmitted. Beam information of at least one selected beam is received in response to transmitting the beam configuration.

An embodiment of the disclosure provides a user equipment including a transceiver and a processor. The processor is coupled to the transceiver and is configured for the following. The processor receives a beam configuration for a plurality of first candidate beams via the transceiver. The processor performs a channel measurement for each of the first candidate beams in response to receiving the beam configuration. The processor reports beam information of at least one selected beam of the first candidate beams via the transceiver in response to receiving the beam configuration.

An embodiment of the disclosure provides a base station including a transceiver and a processor. The processor is coupled to the transceiver and is configured for the following. The processor transmits a beam configuration for a plurality of first candidate beams via the transceiver. The processor receives beam information of at least one selected beam via the transceiver in response to transmitting the beam configuration.

Based on the above, the base station according to the embodiments of the disclosure may control the resources consumed by the user equipment through the beam configuration when the user equipment reports the beam information of the selected beams within the payload of the uplink channel. Moreover, with the uplink grant, the base station may trigger the user equipment to report the beam information of the remaining beams via the PUTSCH. Besides, the user equipment may arbitrary report the beams with a desirable communication quality to the base station. Furthermore, in the embodiments of the disclosure, the two-stage beam configurations may be configured to reduce the computation loading of the user equipment.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The disclosure relates to a beam measuring and reporting method and a base station and user equipment using the same. Compared with the known beam measuring and reporting method, the method described in the embodiments of the disclosure is able to reduce signaling overhead between a base station (BS) and a user equipment (UE). In the embodiment, the term "base station" (BS) covers various examples, such as an evolved NodeB (eNodeB), a next generation NodeB (gNodeB or gNB), an advanced base station (ABS), a base transceiver system (BTS), an access point, a home base station, a relay station, a scatter, a repeater, an intermediate node, or an intermediate/satellite-based communication base station. However, the disclosure is not limited thereto. The term "user equipment" (UE) may cover various examples, such as a mobile station, an advanced mobile station (AMS), a server, a terminal device, a client terminal, a desktop computer, a laptop computer, a netbook, a workstation, a personal digital assistant (PDA), a personal computer (PC), a scanner, a telephone device, a pager, a camera, a television, a handheld gaming device, a music device, a wireless sensor, and the like. However, the disclosure is not limited thereto. In some applications, the UE may be a fixed computer device operated in a mobile environment such as a bus, a train, an airplane, a vessel, a car, and the like. The term "beam" may be represented by an antenna, an antenna port, an antenna element, a group of antennas, a group of antenna ports, or a group of antenna elements. For example, a first beam may be represented as a first antenna port or a first group of antenna ports. However, the disclosure is not limited thereto.

Figure 1:
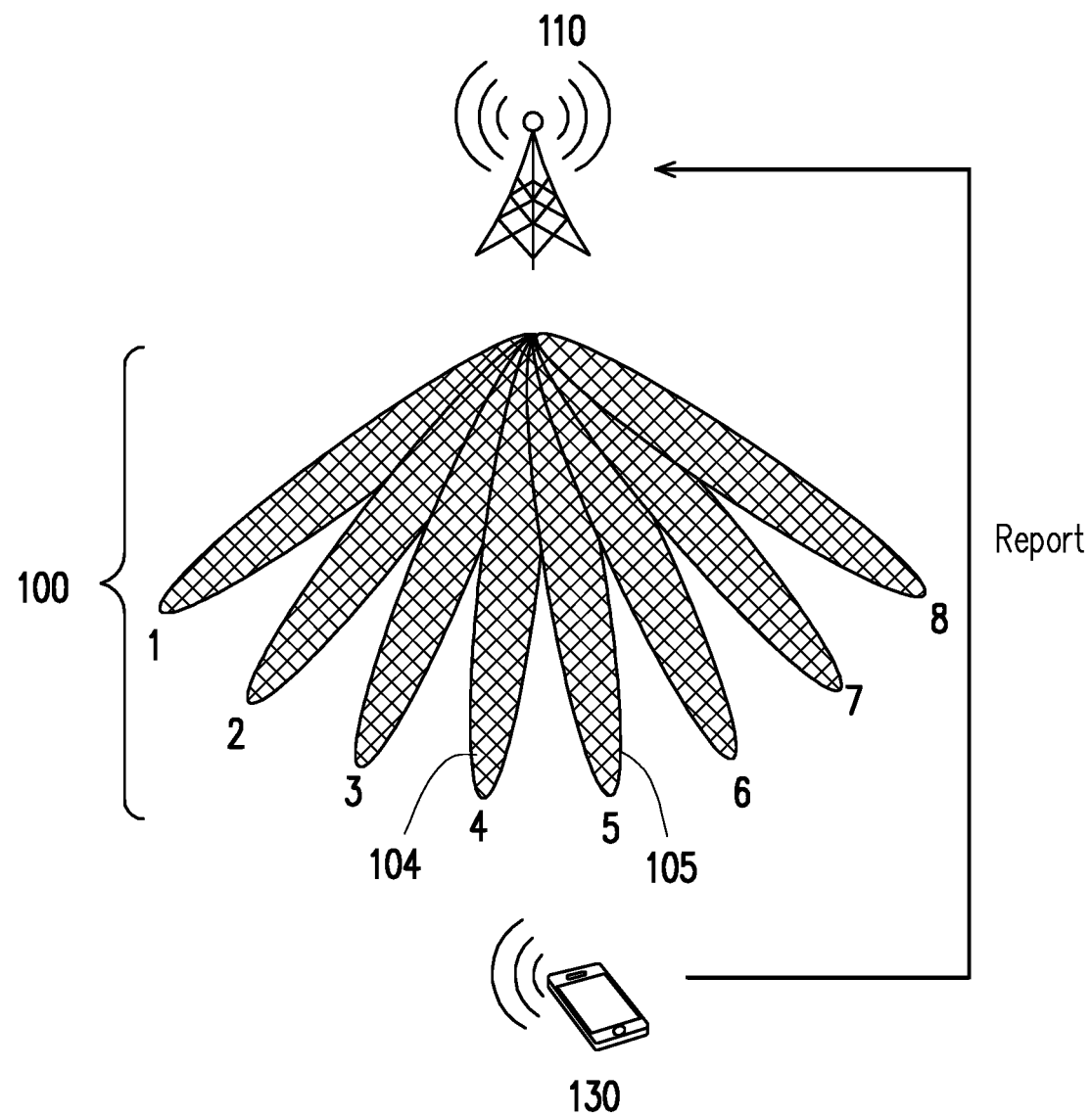
FIG. 1 is a schematic diagram illustrating a coverage of beams of a multibeam wireless communication system.
Figure 2A:
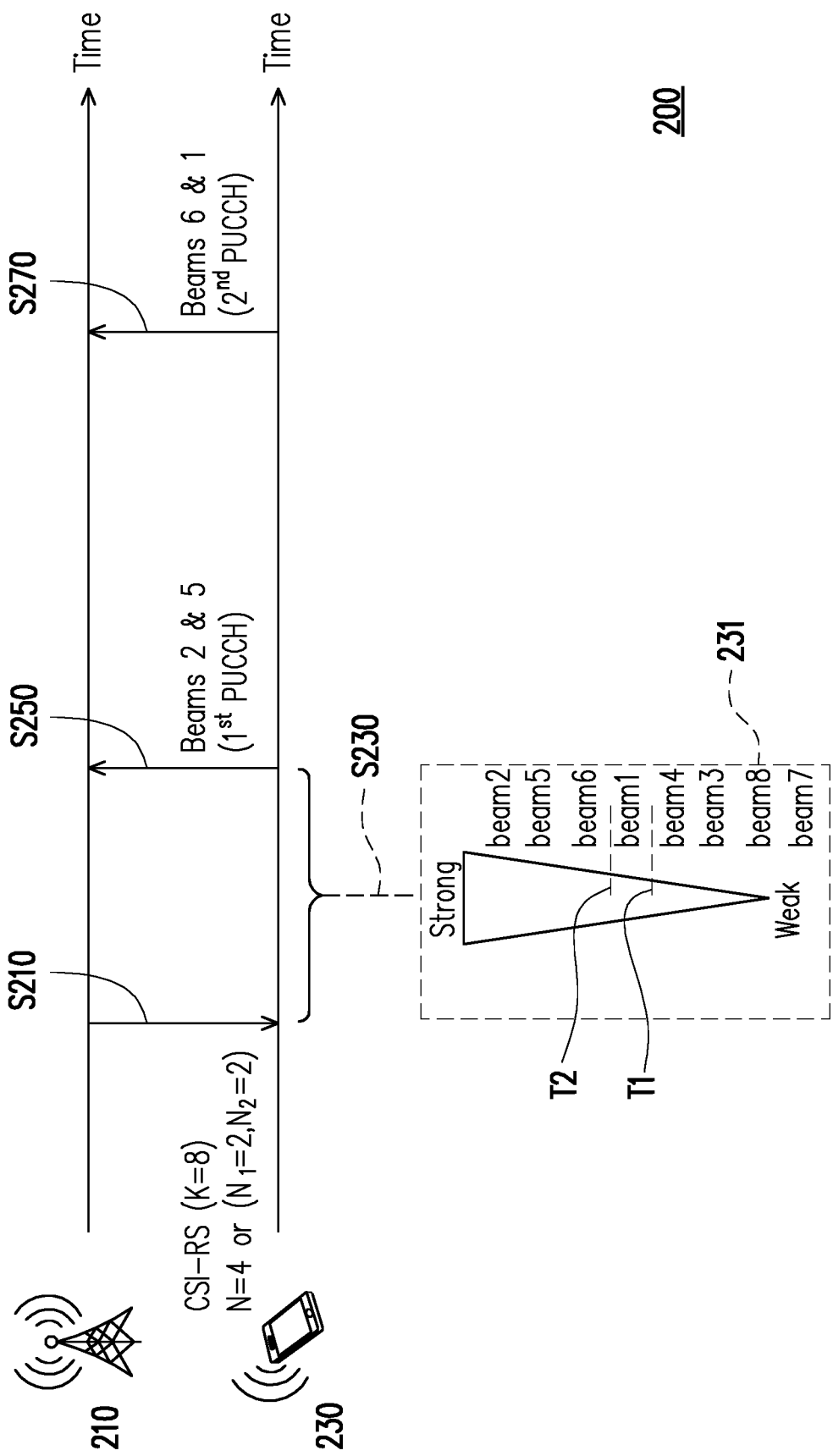
FIG. 2A is a signaling diagram of a beam measuring and reporting method according to an exemplary embodiment of the disclosure.

FIG. 2A is a signaling diagram of a beam measuring and reporting method 200 according to an exemplary embodiment of the disclosure. In the method 200, a UE 230 may be controlled by a BS 210 to report beam information of N selected beams, wherein N is a configured number representing the maximum number that the UE 230 is able to report. Details concerning selection of the selected beams will be described in subsequent paragraphs. Specifically, at Step S210, the BS 210 may transmit a beam configuration which may comprise one or more reference signal resources for K candidate beams to the UE 230. In an exemplary, the one or more reference signal resources may further comprise K' CSI-RS resources corresponding to the K candidate beams, wherein K' may equal to or not equal to K. Accordingly, the UE 230 may perform a channel measurement for the K candidate beams based on the received beam configuration. The reference signal for the K candidate beams may be a channel state information-reference signal (CSI-RS) and/or a synchronization signal block (SSB). However, the disclosure is not limited thereto. The BS 210 may transmit the beam configuration via a signal at a higher wireless network communication protocol layer, such as a radio resource control (RRC) layer, a media access control (MAC)

layer or the like. Even though K is set at 8 in FIG. 2A, the value of K is adjustable based on practical needs.

The beam configuration may include the configured number N. The configured number N is set to instruct the UE 230 to report at most N candidate beams to the BS 210. For example, when the configured number N=4, the UE 230 may report the beam information of at most four candidate beams via one or more uplink channels (e.g., a PUCCH), for example, to the BS 210. In addition, N is less than or equal to K (i.e., N≤K). For example, when there are 8 candidate beams (i.e., K=8), the BS 210 does not instruct the UE 230 to report the beam information of more than eight candidate beams.

In an embodiment, the beam configuration may further instruct the UE 230 to report the beam information of at most $N_i$ candidate beams in each PUCCH, wherein i is an index of the PUCCH. For example, the beam configuration may be configured to instruct a first configured number $N_1$ and a second configured number $N_2$, wherein $N_1+N_2=N$. Even though it is assumed that $N_1=2$ and $N_2=2$ in FIG. 2A, the values of $N_1$ and $N_2$ may be adjusted based on practical needs.

The first configured number $N_1$ corresponds to a first uplink channel (e.g., PUCCH) whose index is "1", and may instruct the UE 230 to report the beam information of at most $N_1$ selected beams via the first uplink channel. The second configured number $N_2$ corresponds to a second uplink channel (e.g., PUCCH) whose index is "2", and may instruct the UE 230 to report the beam information of at most $N_2$ candidate beams via the second uplink channel. Even though the embodiment discloses that the beam configuration may be configured to instruct the first configured number $N_1$ corresponding to the first uplink channel and the second configured number $N_2$ corresponding to the second uplink channel, the beam configuration may also instruct the configured numbers corresponding to a greater or fewer number of uplink channels, as long as the total of the configured numbers of the respective uplink channels is equal to N (i.e., $\Sigma N_i=N$, wherein i represents the index of each PUCCH).

At Step S230, the UE 230 performs a channel measurement for each of the K candidate beams in response to receiving the beam configuration and selects N' selected beams from the K candidate beams based on channel measurement results, wherein N≥N'≥1. In other words, the number of the selected beams selected by the UE 230 may be less than or equal to the configured number N instructed by the BS 210. For example, in the case where the BS 210 instructs the UE 230 to report the beam information of four selected beams to the BS 210, if the UE 230 is only able to find three candidate beams with a desirable communication quality as the selected beams based on the channel measurement results, the UE 230 may report only the beam information of the three selected beams to the BS 210.

Based on the channel measurement result of each candidate beam, the UE 230 selects the candidate beam having a desirable communication quality as the selected beam. The selected beam may be determined based on at least one of channel state information (CSI), reference signal received power (RSRP) and reference signal received quality (RSRQ) of the measured candidate beam which associated with the quality of the selected beam. In addition, the CSI may include at least one of channel quality indicator (CQI), precoding matrix indicator (PMI) and rank indicator (RI). However, the disclosure is not limited thereto. Taking the RSRP as an example, a dotted line frame 231 in FIG. 2A represents a RSRP intensity measured by the UE 230 and a threshold $T_1$. In the K candidate beams received by the UE 230, RSRP values of beams 2, 5, 6, and 1 exceed the threshold $T_1$. Therefore, the UE 230 may select the beams 2, 5, 6, and 1 as the selected beams. The threshold $T_1$ may be determined by a signal at a physical layer (PHY) or a layer higher than the PHY layer and transmitted by the BS 210.

In an embodiment, the UE 230 may determine the selected beam based on a predetermined value. For example, the predetermined value may be set in advance in the UE 230, instead of being the threshold $T_1$ of the signal received from the BS 210. In addition, the threshold $T_1$ may be a threshold associated with a channel parameter such as CSI, RSRP, and/or RSRQ.

In an embodiment, the UE 230 determines the selected beam based on a beam ordering of the K candidate beams. Specifically, the UE 230 orders the K candidate beams based on the channel measurement results (e.g., RSRP, RSRQ, and/or CSI). According to the dotted line frame 231, it can be known that the beam ordering of the K candidate beams is as follows: the beam 2, the beam 5, the beam 6, the beam 1, the beam 4, the beam 3, the beam 8, and the beam 7. Therefore, when selecting the selected beam, the UE 230 may prioritize the beam 2 as the selected beam, followed by the beam 5, and then the beam 6, and so on so forth.

In an embodiment, the UE 230 may determine the selected beam based on a correlation among the K candidate beams. For example, if there is a high spatial correlation between the beam 6 and the beam 4, fields of view (FoV) coverages of the beam 6 and the beam 4 may be similar. Hence, the chance that the UE 230 selects both the beam 6 and the beam 4 as the selected beams may be lower. Alternatively, if there is a low spatial correlation between the beam 6 and the beam 4, such low spatial correlation may indicate that the coverage of the beam 6 and the coverage of the beam 4 are less overlapped. Accordingly, the chance that the UE 230 selects both the beam 6 and the beam 4 may be higher.

After the selected beams are selected, in an embodiment, the UE may determine a selected beam that is already selected as a failure beam based on a special rule and exclude the failure beam from the selected beams.

In an embodiment, the UE 230 may choose the selected beam having a poorer communication quality as the failure beam based on the channel measurement result of each of the selected beams. The failure beam may be determined based on at least one of the CSI, RSRP, and RSRQ of the measured selected beams. Taking the RSRP as an example, the dotted line frame 231 in FIG. 2A represents the RSRP intensity measured by the UE 230 and the threshold $T_1$. Assuming that the UE 230 already selects the beams 2, 5, 6, 1, and 4 as the selected beams. However, based on the channel measurement results, the RSRP value of the beam 4 is lower than the threshold $T_1$. Therefore, the UE 230 may determine the beam 4 as a failure beam. The threshold $T_1$ may be determined by the signal at the PHY layer or a layer higher than the PHY layer and is transmitted by the BS 210 and received by the UE 230.

In an embodiment, the UE 230 determines the failure beam based on a predetermined value. For example, the predetermined value may be set in advance in the UE 230, instead of the threshold $T_1$ of the signal received from the BS 210.

In an embodiment, the UE 230 determines the failure beam based on the correlation among the N selected beams. For example, assuming that N=4 (i.e., the UE 230 reports at most 4 selected beams to the BS 210), and the UE 230 already preliminarily determines the beams 2, 5, 6, 1, and 4 as the selected beams based on any of the processes described above, the UE 230 may determine the failure beam based on a spatial correlation among the beams 2, 5, 6, 1, and 4. More specifically, if there is a high spatial correlation between the beams 6 and 4, the coverage of the FoV of the beam 6 may be similar to that of the FoV of the beam 4. Under the circumstance, the UE 230 may determine one of the beams 6 and 4 as the failure beam. If the beam 4 is determined as the failure beam, the beams eventually selected are the beams 2, 5, 6, and 1.

At Step S250, the UE 230 selects $N_1'$ selected beams from the K candidate beams via the first uplink channel based on the first configured number $N_1$ instructed in the beam configuration, and reports the beam information of the selected beams to the BS 210, wherein $N_1 \geq N_1'$. In other words, the number $N_1'$ of the selected beams reported by the UE 230 via the first uplink channel may be less than or equal to the first configured number $N_1$ instructed by the BS 210. For example, in the case where the BS 210 instructs the UE 230 to report the beam information of two selected beams to the BS 210 via the first uplink channel, if the UE 230 is only able to find one candidate beam with a desirable communication quality as the candidate beam based on the channel measurement results, the UE 230 may report the beam information of only one selected beam to the BS 210. In FIG. 2A, the UE 230 may choose to report the beam information of the beam 2 having the highest RSRP and the beam 5 having the second highest RSRP to the BS 210 via the first uplink channel, or choose to report only the beam information of the beam 2 having the highest RSRP to the BS 210 via the first uplink channel.

In addition, the UE 230 may report joint beam information of $N_1''$ selected beams via the first uplink channel based on the first configured number $N_1$ instructed in the beam configuration, wherein $N_1''$ may be determined according to $N_1$ or N (e.g., $N \geq N_1 \geq N_1''$), or according to the higher layer (or physical layer) signaling. For example, the UE 230 may report the joint beam information of the beams 2 and 5 to the BS 210 via the first uplink channel, and the joint beam information may include multibeam-related information between the beams 2 and 5.

At Step S270, the UE 230 may report beam information of $N_2'$ selected beams via the second uplink channel (e.g., PUCCH) based on the second configured number $N_2$ instructed in the beam configuration, wherein $N_2 \geq N_2'$. In other words, the number $N_2'$ of the selected beams reported by the UE 230 via the second uplink channel may be less than or equal to the second configured number $N_2$ instructed by the BS 210. For example, in the case where the BS 210 instructs the UE 230 to report the beam information of two selected beams to the BS 210 via the second uplink channel, if the UE 230 is only able to find one candidate beam with a desirable communication quality as the selected beam based on the channel measurement result, the UE 230 may report only the beam information of one selected beam to the BS 210 via the second uplink channel. In FIG. 2A, if the UE 230 selects the selected beams based on the threshold $T_1$, the UE 230 may report the beam information of the beams 6 and 1 whose RSRPs are greater than the threshold $T_1$ to the BS 210 via the second uplink channel. Under the circumstance, $N_2 = N_2' = 2$. In addition, if the UE 230 determines the selected beams based on a threshold $T_2$, the UE 230 may report the beam information of the beam 6 whose RSRP is higher than the threshold $T_2$ to the BS 210 via the second uplink channel. Under the circumstance, $N_2 = 2 > N_2' = 1$. When $N_2' = 0$, the UE 230 may skip Step S270.

In addition, the UE 230 may report the joint beam information of $N_2''$ selected beams to the BS 210 via the second uplink channel based on the second configured number $N_2$ instructed in the beam configuration, wherein $N_2''$ may be determined according to $N_2$ or N (e.g., $N \geq N_2 \geq N_2''$), or according to the higher layer (or physical layer) signaling. Since the UE 230 already obtains the beam information of the beams 2 and 5 via the first uplink channel at Step S250, the joint beam information reported by the UE 230 at Step S270 may be associated with the beams 2 and 5. For example, the UE 230 may report the joint beam information of the beams 6 and 1 to the BS 210 via the second uplink channel, and the joint beam information may include the multibeam related information between the beams 6 and 1. In addition, the UE 230 may also report the joint beam information of the beams 2, 5, and 6 via the second PUCCH, and the joint beam information may include the multibeam related information among the beams 2, 5, and 6.

The beam information may include at least one of the following: the number of the selected beams, indexes of the selected beams, a precoding matrix indicator (PMI) of each of the selected beams, the beam ordering of the selected beams determined based on the channel measurement results (e.g., RSRP, RSRQ, and/or CSI), the measurement result corresponding to each of the selected beams, a joint measurement result corresponding to the selected beams, and a differential value of the measurement results of the selected beams, wherein the differential value is determined by performing a difference operation on a value of a strongest beam of the at least one selected beam and a value of a non-strongest beam of the at least one selected beam. Nevertheless, the disclosure is not limited thereto. The beam information may further include the multibeam related information of the selected beams, and the multibeam related information may include at least one of the following: a joint PMI of the selected beam and the joint measurement result of the selected beams.

Figure 2B:
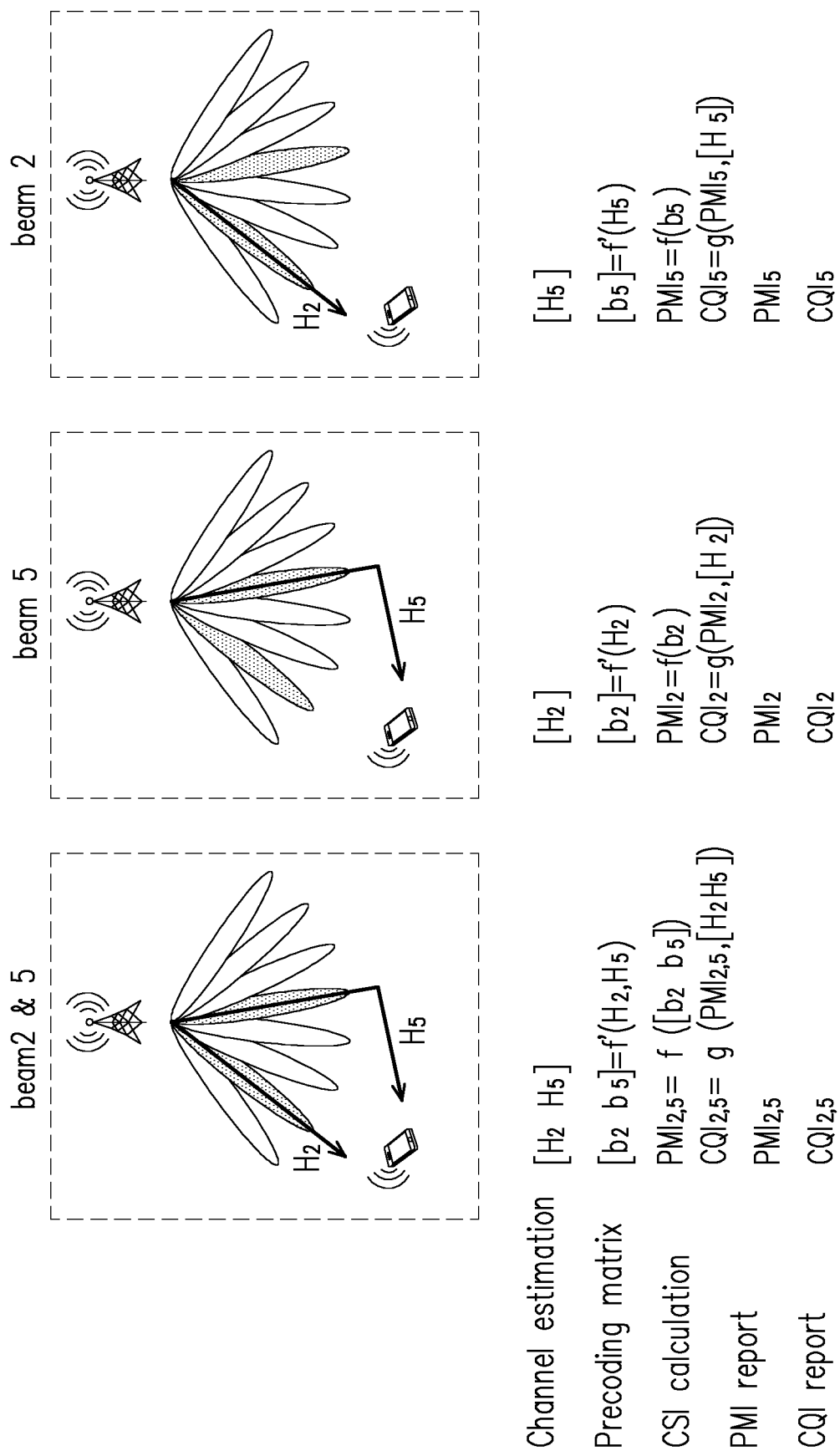
FIG. 2B is a schematic diagram further illustrating a channel measurement result of a first embodiment according to the method of FIG. 2A.

FIG. 2B is a schematic diagram further illustrating a channel measurement result of a first embodiment according to the method 200 of FIG. 2A. As shown in FIG. 2B, in addition to performing the channel measurement for each of the K candidate beams in response to receiving the beam configuration and thereby obtain the PMIs and the measurement results of the selected beams, the UE 230 may further perform a joint channel measurement for an arbitrary combination of the K candidate beams to thereby obtain the joint PMI and the joint measurement result corresponding to the selected beams. The measurement result may be a channel quality indicator (CQI), and the joint measurement result may be a joint CQI. As shown in FIG. 2B, the UE 230 may respectively perform the channel measurements for the beams 2 and 5 of the 8 (K=8) candidate beams to obtain "$H_2$" and "$H_5$" as channel estimations of the beams 2 and 5. The UE 230 may determine a precoding vector "$b_2$" corresponding to the beam 2 based on the channel estimation "$H_2$" and determine a precoding vector "$b_5$" corresponding to the beam 5 based on the channel estimation "$H_5$". After the precoding vector "$b_2$" of the beam 2 and the precoding vector "$b_5$" of the beam 5 are determined, the UE 230 may determine a precoding matrix indicator $PMI_2$ based on the precoding vector "$b_2$", and determine a precoding matrix indicator $PMI_5$ based on the precoding vector "$b_5$". Then, the UE 230 may calculate a channel quality indicator $CQI_2$ corresponding to the beam 2 based on the precoding matrix indicator $PMI_2$ and the channel estimation "$H_2$", and calculate a channel quality indicator $CQI_5$ corresponding to the beam 5 based on the precoding matrix indicator $PMI_5$ and the channel estimation "$H_5$".

In addition, the UE 230 may further perform the joint channel measurement for the combination of the beams 2 and 5 in the 8 (K=8) candidate beams to thereby obtain a joint channel estimation $[H_2, H_5]$ of the beams 2 and 5. Based on "$[H_2, H_5]$", the UE 230 may determine a precoding matrix (or a precoder) "$[b_2\ b_5]$" corresponding to the beams 2 and 5. After the precoding matrix "$[b_2\ b_5]$" of the beams 2 and 5 is determined, the UE 230 may determine a joint precoding matrix indicator $PMI_{2,5}$ based on the precoding matrix "$[b_2\ b_5]$". Then, the UE 230 may calculate a joint channel quality indicator $CQI_{2,5}$ corresponding to the beams 2 and 5 based on the joint precoding matrix indicator $PMI_{2,5}$ and the channel estimation "$[H_2, H_5]$".

Figure 2C:
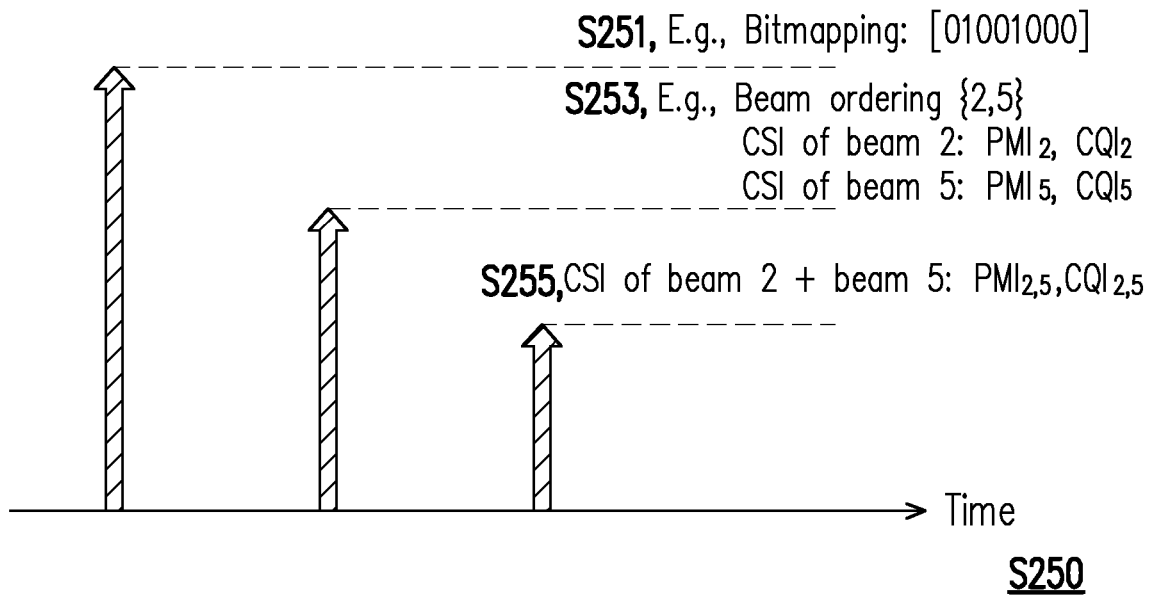
FIG. 2C is a diagram further illustrating Step S250 in the first embodiment of the method of FIG. 2A.

FIG. 2C is a diagram further illustrating Step S250 in the first embodiment of the method 200 of FIG. 2A. As shown in FIG. 2C, Step S250 in the first embodiment of the method 200 of FIG. 2A may be further divided into Steps S251, S253, and S255.

At Step S251, the UE 230 may report the number of the selected beams and the indexes of the selected beams in the beam information to the BS 210 via the first uplink channel. The process of reporting the number of the selected beams and the indexes of the selected beams may be chosen based on practical needs. For example, the UE 230 may report the number of the selected beams and the indexes of the selected beams to the BS 210 in one process through bitmapping. More specifically, the UE 230 may transmit a bit stream "01001000" to the BS 210 at Step S251, wherein the length of the bit stream represents the number of the candidate beams (i.e., K=8). If the $j^{th}$ bit in the bit stream is "1", the $j^{th}$ candidate beam is selected as the selected beam by the UE 230. If the $j^{th}$ bit in the bit stream is "0", the $j^{th}$ candidate beam is not selected as the selected beam by the UE 230. The bit stream "01001000" indicates that the UE 230 selects the beams 2 and 5 as the selected beams from the eight candidate beams. Accordingly, the total number of "1" in the bit stream represents the number $N_1'$ of the selected beams to be reported via the first uplink channel, and the position showing "1" in the bit stream represents the index of the selected beam (i.e., the beams 2 and 5) to be reported by the UE 230 via the first uplink channel. In addition, the index of the selected beam may be represented in the form of a CSI-RS resource indicator (CRI) or an SSB resource indicator (SSBRI).

At Step S253, the UE 230 reports the CSI of the selected beams in the beam information to the BS 210 via the first uplink channel. The CSI of the selected beams may include at least one of the PMI of the selected beams, the beam ordering of the selected beams, and the measurement results corresponding to the selected beams. The beam ordering of the selected beams informs the BS 210 of an ordering of the communication quality of the selected beams reported via the first uplink channel. When the beam ordering is {2, 5}, the BS 210 is informed that the communication quality when the BS 210 uses the beam 2 to communicate with the UE 230 is more desirable than the communication quality when the BS 210 uses the beam 5 to communicate with the UE 230. Therefore, when selecting a transmission beam to the UE 230, the BS 210 may prioritize the beam 2 for the communication with the UE 230. The PMI of the selected beams informs the BS 210 of the precoding matrix corresponding to the selected beams reported via the first uplink channel. For example, when the BS 210 receives the $PMI_2$ corresponding to the beam 2 and the $PMI_5$ corresponding to the beam 5 from the UE 230, the BS 210 may select the precoding matrix corresponding to the $PMI_2$ when adopting the beam 2 for communication and select the precoding matrix corresponding to the $PMI_5$ when adopting the beam 5 for communication. Based on the measurement results, the BS 210 may be informed of the channel measurement results of the selected beams reported via the first uplink channel. For example, when the UE 230 selects the beams 2 and 5 as the selected beams, the UE 230 may report the $CQI_2$ corresponding to the beam 2 and the $CQI_5$ corresponding to the beam 5 to the BS 210 via the first uplink channel. Accordingly, the BS 210 is informed of the communication quality of the beams 2 and 5.

At Step S255, the UE 230 may report the joint PMI and the joint measurement result corresponding to the selected beams to the BS 210 via the first uplink channel. The joint PMI and the joint measurement result are applicable in multibeam transmission. Specifically, the BS 210 may instruct the UE 230 to turn on/off the function of multibeam transmission through a signal at the PHY layer or a higher layer. When the function of multibeam transmission is turned on, the BS 210 and the UE 230 may communicate with each other by simultaneously using multiple beams. The UE 230 may recommend the BS 210 to choose a precoding matrix suitable for multibeam transmission through the joint PMI reporting. When the BS 210 receives the joint precoding matrix indicator $PMI_{2,5}$ corresponding to the beams 2 and 5 from the UE 230, the BS 210 may select a precoding matrix corresponding to the $PMI_{2,5}$ when multibeam transmission is carried out with the beams 2 and 5. In addition, when the UE 230 selects the beams 2 and 5 as the selected beams for multibeam transmission, the UE 230 may report the joint channel quality indicator $CQI_{2,5}$ corresponding to the beams 2 and 5 to the BS 210 via the first uplink channel. Accordingly, the BS 210 is informed of the communication quality when the beams 2 and 5 are simultaneously adopted for multibeam transmission.

Figure 2D:
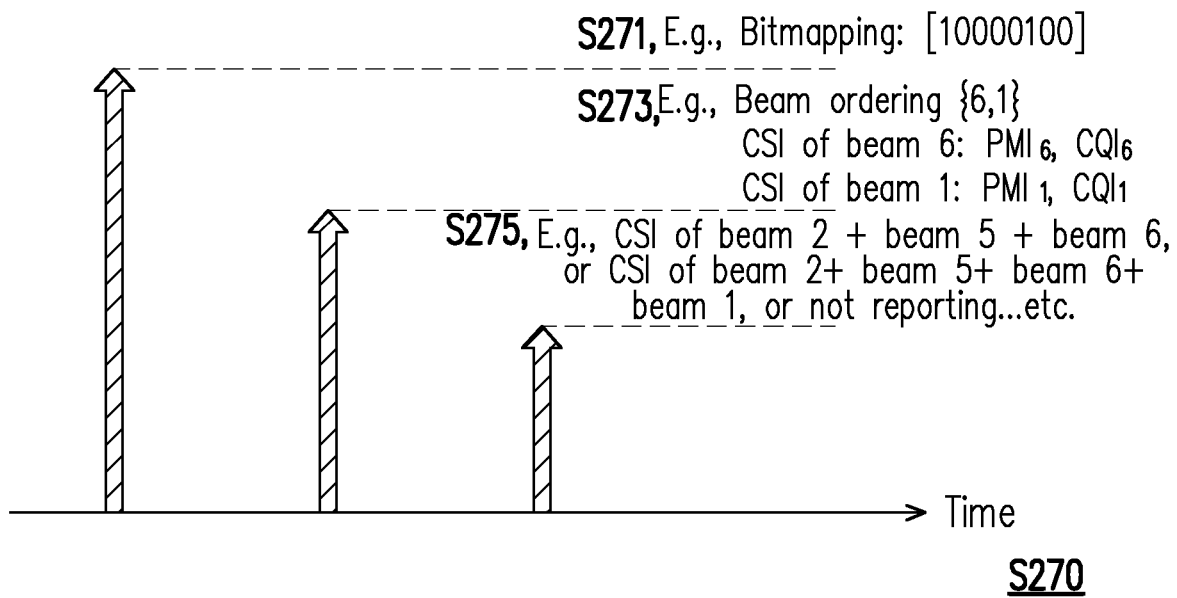
FIG. 2D is a diagram further illustrating Step S270 in the first embodiment of the method of FIG. 2A.

FIG. 2D is a diagram further illustrating Step S270 in the first embodiment of the method 200 of FIG. 2A. As shown in FIG. 2D, Step S270 may be further divided into Steps S271, S273, and S275. In addition to the different uplink channels used and the different selected candidates reported, Steps S271 and S273 are similar to Steps S251 and S253 in FIG. 2C. Therefore, details in this regard will not be repeated in the following. Step S275 differs from Step S255 in that, before Step S275, the BS 210 already receives the channel measurement results of the beams 2 and 5 via the first uplink channel at Step S250. Accordingly, in addition to reporting the joint PMI and the joint measurement result of the beams 6 and 1 to the BS 210 via the second uplink channel (e.g., PUCCH), the UE 230 may further consider reporting the joint PMI and the joint measurement result associated with the beams 2 and 5 to the BS 210. For example, at Step S275, the UE 230 may further report at least one of the following to the BS 210: a joint precoding matrix indicator $PMI_{6,1}$ and a joint channel quality indicator $CQI_{6,1}$ of the beams 6 and 1, the joint precoding matrix indicator $PMI_{2,5}$ and the joint channel quality indicator $CQI_{2,5}$ of the beams 2 and 5, a joint precoding matrix indicator $PMI_{2,5,6}$ and a joint channel quality indicator $CQI_{2,5,6}$ of the beams 2, 5, and 6, and a joint precoding matrix indicator $PMI_{2,5,6,1}$ and a joint channel quality indicator $CQI_{2,5,6,1}$ of the beams 2, 5, 6, and 1, etc. In addition, the UE 230 may choose not to report any joint PMI and joint measurement result to the BS at Step S275 (e.g., when the BS 210 or the UE 230 chooses not to carry out multibeam transmission).

Figure 2E:
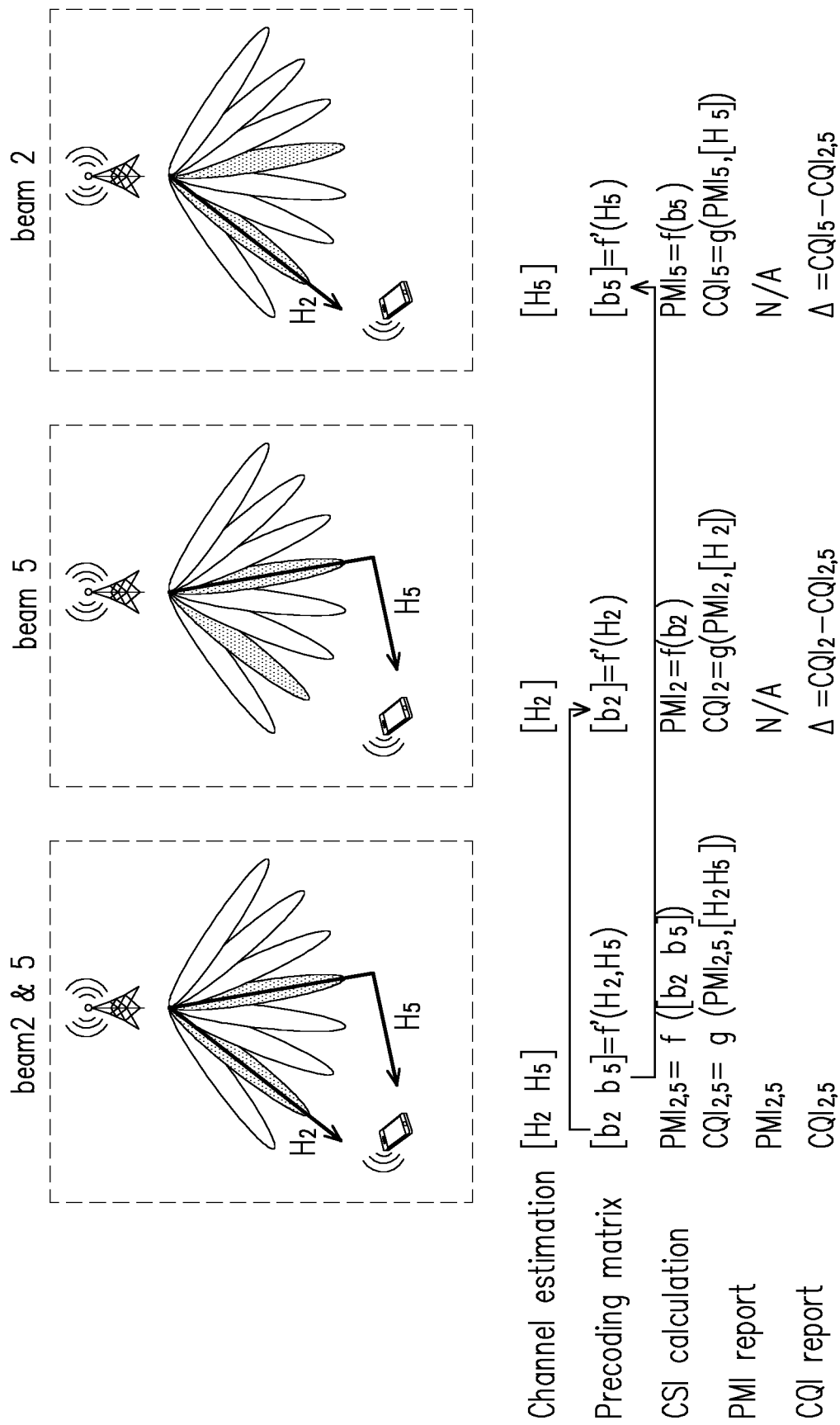
FIG. 2E is a schematic diagram further illustrating a channel measurement result of a second embodiment according to the method of FIG. 2A.

FIG. 2E is a schematic diagram further illustrating a channel measurement result of a second embodiment according to the method 200 of FIG. 2A. When the joint precoding matrix of the beams 2 and 5 exhibits a nested property, individual precoding vectors of the beams 2 and 5 may be derived from the joint precoding matrix of the beams 2 and 5, as shown in FIG. 2E. Therefore, when the UE 230 reports the joint precoding matrix indicator $PMI_{2,5}$ of the beams 2 and 5, the BS 210 may derive the precoding vector "[$b_2$]" of the beam 2 and the precoding vector "[$b_5$]" of the beam 5 based on the corresponding precoding matrix "[$b_2$ $b_5$]" corresponding to the $PMI_{2,5}$. Accordingly, the step that the UE 230 reports the precoding matrix indicator $PMI_2$ of the beam 2 and the precoding matrix indicator $PMI_5$ of the beam 5 to the BS 210 may be omitted to reduce signaling overhead.

In addition, instead of reporting the complete CQI of the selected beams, the UE 230 may report only a differential value of the measurement results of the selected beams to reduce transmission resources consumed for transmitting the CQI information. After the UE 230 reports the joint channel quality indicator $CQI_{2,5}$ of the beams 2 and 5 to the BS 210, instead of reporting the complete $CQI_2$ of the beam 2, the UE 230 may report only a differential value $\Delta_2$ between the $CQI_{2,5}$ and $CQI_2$, and the BS 210 may derive the $CQI_2$ of the beam 2 accordingly based on the received $CQI_{2,5}$ and $\Delta_2$. Similarly, instead of reporting the complete $CQI_5$ of the beam 5, the UE 230 may report only a differential value $\Delta_5$ between the $CQI_{2,5}$ and $CQI_5$, and the BS 210 may derive the $CQI_5$ of the beam 5 accordingly based on the received $CQI_{2,5}$ and $\Delta_5$.

Figure 2F:
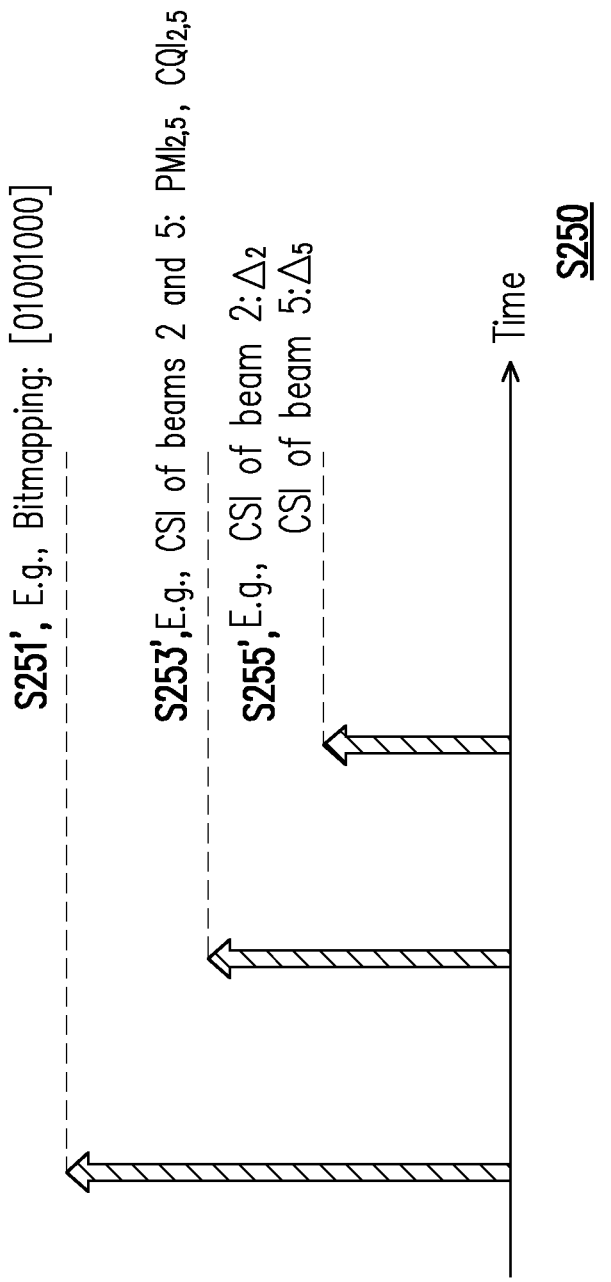
FIG. 2F is a diagram further illustrating Step S250 in the second embodiment of the method of FIG. 2A.

FIG. 2F is a diagram further illustrating Step S250 in the second embodiment of the method 200 of FIG. 2A. As shown in FIG. 2F, Step S250 in the second embodiment of the method 200 of FIG. 2A may be further divided into Steps S251', S253', and S255'. In addition, Step S251' is similar to Step S251 in FIG. 2C. Therefore, details in this regard will not be repeated in the following.

At Step S253', the UE 230 may report the beam ordering of the selected beams and the joint PMI and the joint measurement result corresponding to the selected beams in the beam information to the BS 210 via the first uplink channel. The beam ordering of the selected beams notifies the BS 210 of an ordering of the communication quality of the selected beams reported via the first uplink channel. When the beam ordering is {2, 5}, the BS 210 is informed that the communication quality when the BS 210 uses the beam 2 to communicate with the UE 230 is more desirable than the communication quality when the BS 210 uses the beam 5 to communicate with the UE 230. Therefore, when selecting a transmission beam to the UE 230, the BS 210 may prioritize the beam 2 for the communication with the UE 230. The joint PMI and the joint measurement result are applicable in multibeam transmission. When the BS 210 receives the joint precoding matrix indicator $PMI_{2,5}$ corresponding to the beams 2 and 5 from the UE 230, the BS 210 may select a precoding matrix corresponding to the $PMI_{2,5}$ when multibeam transmission is carried out with the beams 2 and 5. In addition, when the UE 230 selects the beams 2 and 5 as the selected beams for multibeam transmission, the UE 230 may report the joint channel quality indicator $CQI_{2,5}$ corresponding to the beams 2 and 5 to the BS 210 via the first uplink channel. Accordingly, the BS 210 is informed of the communication quality when the beams 2 and 5 are simultaneously adopted for multibeam transmission.

At Step S255', the UE 230 may report the differential value of the measurement results of the selected beams in the beam information to the BS 210 via the first uplink channel. The UE 230 reports the differential value $\Delta_2$ between the $CQI_{2,5}$ and $CQI_2$ to the BS 210. The BS 210 may derive the $CQI_2$ of the beam 2 based on the $CQI_{2,5}$ and the $\Delta_2$ received at Step S253'. Similarly, the UE 230 may report the differential value $\Delta_5$ between the $CQI_{2,5}$ and $CQI_5$ to the BS 210 via the first PUCCH at Step S255'. The BS 210 may derive the $CQI_5$ of the beam 5 based on the $CQI_{2,5}$ and the $\Delta_5$ received at Step S253'.

Figure 2G:
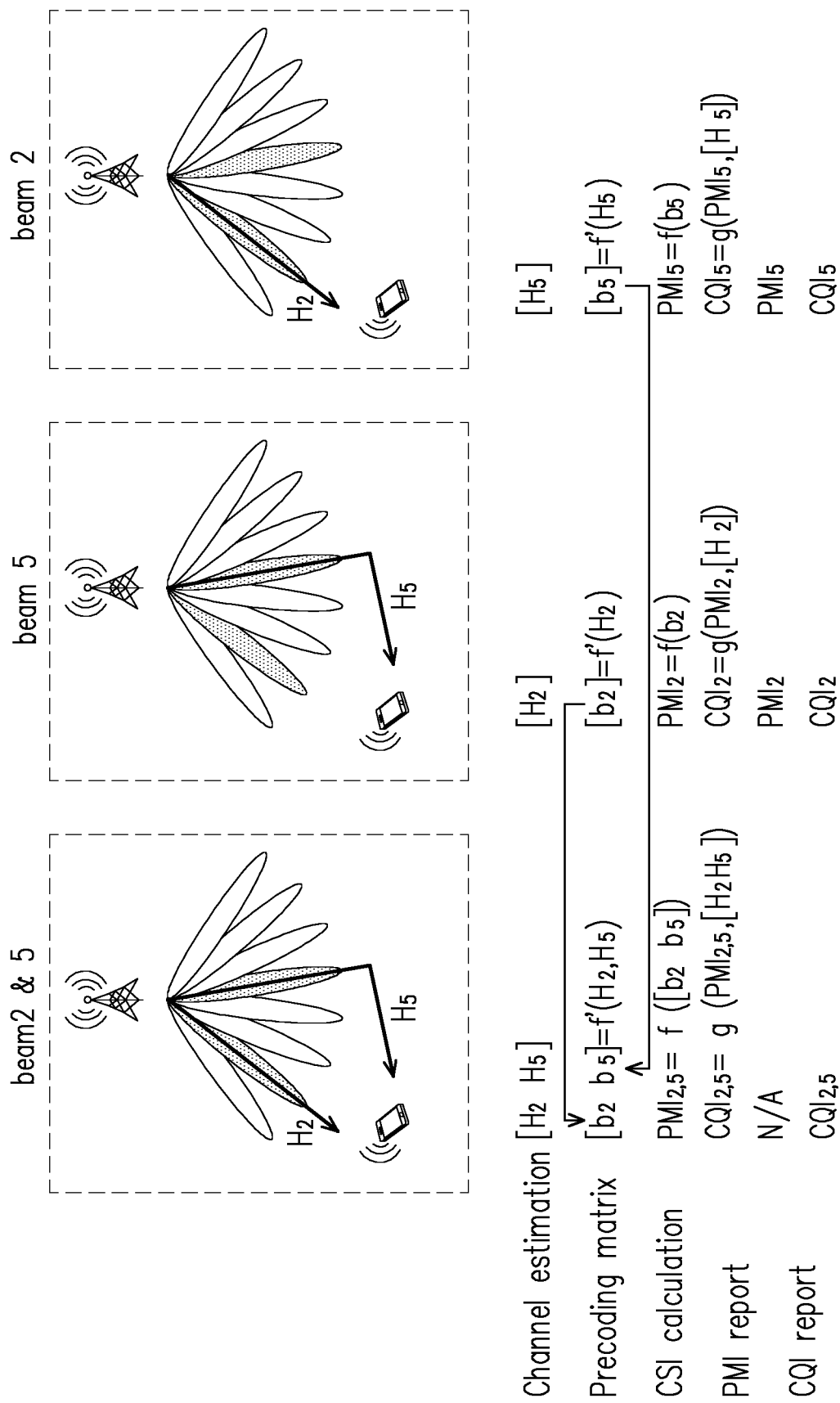
FIG. 2G is a schematic diagram further illustrating a channel measurement result of a third embodiment according to the method of FIG. 2A.

FIG. 2G is a schematic diagram further illustrating a channel measurement result of a third embodiment according to the method 200 of FIG. 2A. When the precoding vectors of the beams 2 and 5 exhibit a nested property, the joint precoding vector of the beams 2 and 5 may be derived from the individual precoding vectors of the beams 2 and 5, as shown in FIG. 2G. Therefore, when the UE 230 reports the precoding matrix indicator $PMI_2$ of the beam 2 and the precoding matrix indicator $PMI_5$ of the beam 5 to the BS 210, the BS 210 may derive the joint precoding matrix [$b_2$ $b_5$] of the beams 2 and 5 based on the precoding vector "[$b_2$]" and the precoding vector "[$b_5$]" respectively corresponding to the $PMI_2$ and the $PMI_5$. Accordingly, the step that the UE 230 reports the joint precoding matrix indicator $PMI_{2,5}$ of the beams 2 and 5 to the BS 210 may be omitted, and the signaling overhead may be thus be reduced.

Figure 2H:
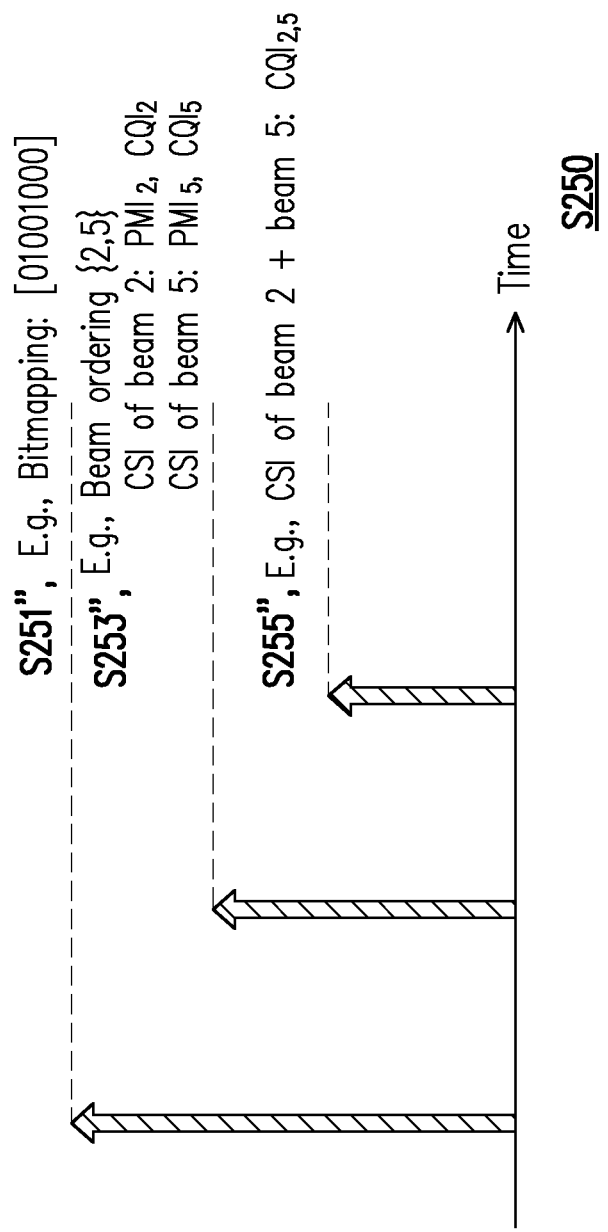
FIG. 2H is a diagram further illustrating Step S250 in the third embodiment of the method of FIG. 2A.

FIG. 2H is a diagram further illustrating Step S250 in the third embodiment of the method 200 of FIG. 2A. As shown in FIG. 2H, Step S250 in the third embodiment of the method 200 of FIG. 2A may be further divided into Steps S251", S253", and S255". Step S251" is the same as Step S251 in FIG. 2C, and Step S253" is the same as Step S253 in FIG. 2C. Therefore, details in this regard will not be repeated in the following.

At Step S255", the UE 230 may report the joint measurement (i.e., $CSI_{2,5}$) corresponding to the selected beams to the BS 210 via the first uplink channel, and is not required to report the joint PMI (i.e., $PMI_{2,5}$) corresponding to the selected beams to the BS 210. The BS 210 may derive the joint precoding matrix "[$b_2$ $b_5$]" of the beams 2 and 5 based on the precoding vector "[$b_2$]" and the precoding vector "[$b_5$]" respectively corresponding to the $PMI_2$ and the $PMI_5$.

Taking the uplink channel as a PUCCH as an example, Since the maximum payload size of the PUCCH is fixed, the selected beam information that the UE needs to report may exceed the maximum payload size of the PUCCH, as shown in Formula 1:

$$N' \times (b_{B1} + b_{Quality}) > \text{Payload}_{PUCCH} \quad \text{Formula 1,}$$

wherein N' represents the number of the selected beams selected by the UE, $b_{BI}$ represents the number of bits required for the UE to report beam indexes (BI) of the selected beams, $b_{Quality}$ represents the number of bits required for the UE to report the measurement results of the selected beams, and $\text{Payload}_{PUCCH}$ represents the maximum payload size of a PUCCH, wherein the BI may be represented by a CSI-RS resource indicator (CRI) or an SSB resource indicator (SSBRI). However, the disclosure is not limited thereto. Based on Formula 1, as the number N' of the selected beams becomes greater, the chance that relevant information of the selected beams that the UE needs to report exceeds the maximum payload size of the PUCCH may become higher. Therefore, it is important to control the number of the elected beams reported by the UE via one PUCCH. The BS 210 in the method 200 of embodiment of the disclosure may instruct on the maximum number of the selected beams reported by the UE 230 via each uplink channel (e.g., PUCCH) through the beam configuration.

Therefore, the resources consumed by the UE 230 when reporting the beam information of the selected beams may be controlled within the maximum payload size of one PUCCH.

Figure 3A:
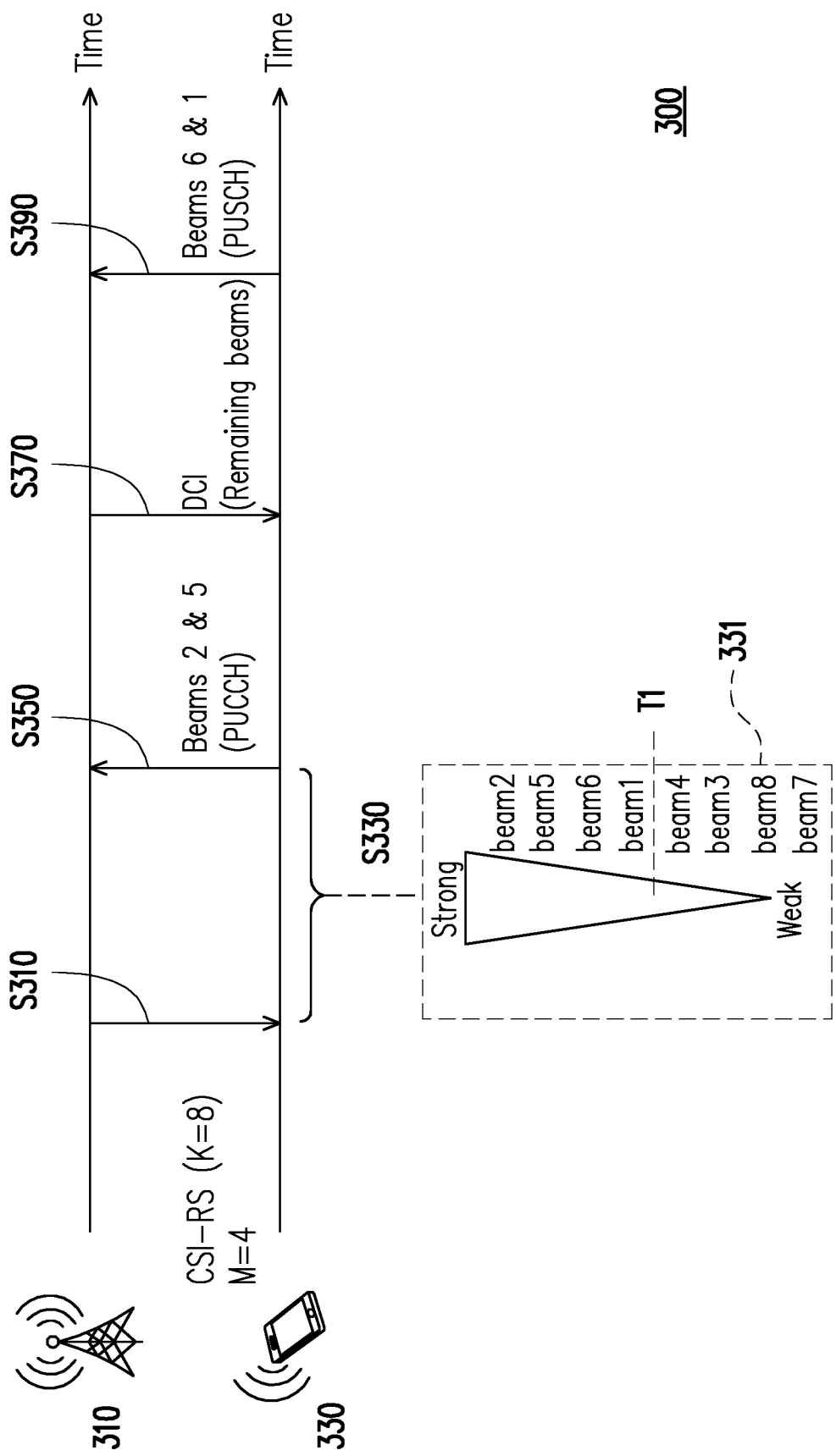
FIG. 3A is a signaling diagram of a beam measuring and reporting method according to an exemplary embodiment of the disclosure.

FIG. 3A is a signaling diagram of a beam measuring and reporting method 300 according to an exemplary embodiment of the disclosure. In the method 300, a UE 330 may be controlled by a BS 310 to report beam information of M selected beams, wherein M is a configured number indicating the maximum number that the UE 330 is able to report. Specifically, at Step S310, the BS 310 may transmit a beam configuration which may comprise one or more reference signal resources for K candidate beams to the UE 330. In an exemplary, the one or more reference signal resources may further comprise K' CSI-RS resources corresponding to the K candidate beams, wherein K' may equal to or not equal to K. Accordingly, the UE 330 may perform channel measurements for the K candidate beams based on the received beam configuration. The reference signal for the K candidate beams may be a CSI-RS and/or an SSB. However, the disclosure is not limited thereto. The BS 310 may transmit the beam configuration via a signal at a higher wireless network communication protocol layer, such as the RRC layer, the MAC layer or the like. Even though K is set at 8 in FIG. 3A, the value of K is adjustable based on practical needs.

The beam configuration may include the configured number M. The configured number M instructs the UE 330 to report at most M candidate beams to the BS 310. For example, when the configured number M=4, the UE 330 may report the beam information of at most four sets of candidate beams via the uplink channel to the BS 310. In addition, M is less than or equal to K (i.e., M≤K). For example, when there are 8 candidate beams (i.e., K=8), the BS 310 does not instruct the UE 330 to report the beam information of more than eight candidate beams.

At Step S330, the UE 330 performs the channel measurement for each of the K candidate beams in response to receiving the beam configuration and selects M' selected beams (e.g., the beams 2, 5, 6, and 1) from the K candidate beams based on the channel measurement results. Then, based on the channel measurement results (e.g., RSRP), the UE 330 selects $M_1$' selected beams having a desirable communication quality as $M_1$' optimal beams (e.g., beams 2 and 5) from the M' selected beams, wherein M≥M'≥$M_1$'≥1.

At Step S350, the UE 330 may report the $M_1$' optimal beams to the BS 310 via the first uplink channel based on the configured number M instructed in the beam configuration. In the embodiment, the first uplink channel may be a PUCCH. In other words, the number of the optimal beams reported by the UE 330 via the first uplink channel may be less than or equal to the configured number M instructed by the BS 310. For example, in the case where the BS 310 instructs the UE 330 to report the beam information of four beams to the BS 310, the UE 330 may report only the beam information of two optimal beams (i.e., the beams 2 and 5) to the BS 310 via the first uplink channel. When the BS 310 receives the beam information of the $M_1$' optimal beams returned from the UE 330, the BS 310 may refer to the configured number M and the number $M_1$' of the optimal beams and thereby determine the number $M_2$' of remaining beams, wherein $M_2$'=M−$M_1$'. For example, when the BS 310 receives the beam information of the two optimal beams reported by the UE 330, the BS 310 may refer to the configured number M (M=4) and the number $M_1$'=2 of the optimal beams and thereby determine the number $M_2$'=4−2=2 of the remaining beams.

At Step S370, the BS 310 transmits an uplink grant to the UE 330 to thereby instruct the UE 330 to report the beam information of the remaining beams to the BS 310. For example, the BS 310 may transmit the uplink grant to the UE 330 through downlink control information (DCI), so as to instruct the UE 330 to report the beam information of the remaining beams to the BS 310 via the second uplink channel. In the embodiment, the second uplink channel may be a physical uplink shared channel (PUSCH). In addition, the DCI information includes a configured number $M_2$' of the remaining beams provided for instructing the UE 330 to report the beam information of $M_2$' remaining beams to the BS 310. Alternatively, the BS 310 may not instruct the UE 330 on the configured number $M_2$' of the remaining beams and may let the UE 330 to determine the number $M_2$' of the remaining beams to be reported on its own.

At Step S390, the UE 330 reports the beam information corresponding to the remaining beams to the BS 310 in response to receiving the uplink grant. For example, the UE 330 may determine beams other than the $M_1$' optimal beams (i.e., beams 2 and 5) as the remaining beams (i.e., beams 6 and 1), and report the beam information of the remaining beams to the BS 310 via the second uplink channel.

Figure 3B:
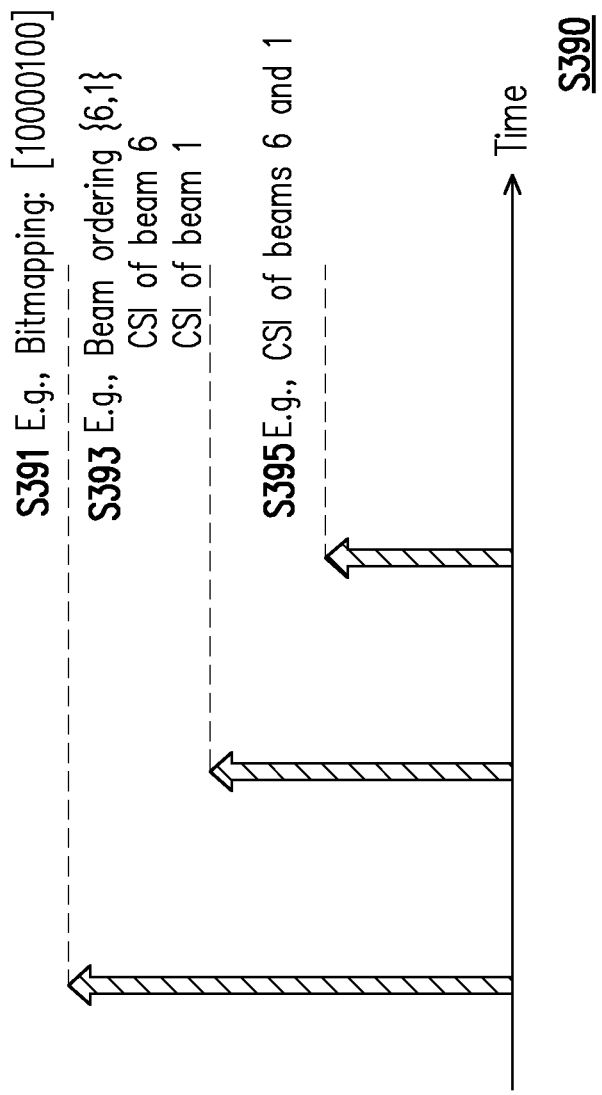
FIG. 3B is a diagram further illustrating Step S390 in the method of FIG. 3A.

FIG. 3B is a diagram further illustrating Step S390 in the method 300 of FIG. 3A. As shown in FIG. 3B, Step S390 may be further divided into Steps S391, S393, and S395.

At Step S391, the UE 330 may report the number $M_2$' of the remaining beams and the indexes of the remaining beams in the beam information to the BS 310 via the second uplink channel. How the number $M_2$' of the remaining beams and the indexes of the remaining beams are determined may be set based on practical needs. For example, the UE 330 may report the number $M_2$' of the remaining beams and the indexes of the remaining beams to the BS 310 in one process through bitmapping. More specifically, the UE 330 may transmit a bit stream "10000100" to the BS 310 at Step S391, wherein the length of the bit stream represents the number of the candidate beams (i.e., K=8). If the $j^{th}$ bit in the bit stream is "1", the $j^{th}$ candidate beam is determined as the remaining beam by the UE 330. If the $j^{th}$ bit in the bit stream is "0", the $j^{th}$ candidate beam is not determined as the remaining beam by the UE 330. The bit stream "10000100" indicates that the UE 330 determines the beams 6 and 1 as the remaining beams from the eight candidate beams. Therefore, the total number of "1" in the bit stream represents the number $M_2$' of the remaining beams to be reported by the UE 330 via the second uplink channel, and the position showing "1" in the bit stream represents the index of the remaining beam (i.e., beams 6 and 1) to be reported by the UE 330 via the PUSCH. In addition, the index of the remaining beam may be represented in the form of CRI.

At Step S393, the UE 330 reports the CSI of the remaining beams in the beam information to the BS 310 via the PUSCH. The CSI of the remaining beams may include at least one of the PMI of the remaining beams, the beam ordering of the remaining beams, and the measurement results corresponding to the remaining beams. The beam ordering of the remaining beams informs the BS 310 of the ordering of the remaining beams on communication quality reported via the PUSCH. When the beam ordering is {6, 1}, the BS 310 is informed that the communication quality when the BS 310 uses the beam 6 to communicate with the UE 330 is more desirable than the communication quality when the BS 310 uses the beam 1 to communicate with the UE 330. Therefore, when selecting a transmission beam to the UE 330, the BS 310 may prioritize the beam 6 for the communication with the UE 330. The PMI of the remaining beams notifies the BS 310 of the precoding matrix corresponding to each of the remaining beams reported via the second uplink channel. For example, when the BS 310 receives the $PMI_6$ corresponding to the beam 6 and the $PMI_1$ corresponding to the beam 1 from the UE 330, the BS 310 may select the precoding matrix corresponding to the $PMI_6$ when adopting the beam 6 for communication and select the precoding matrix corresponding to the $PMI_1$ when adopting the beam 1 for communication. The measurement results may inform the BS 310 of the channel measurement results of the remaining beams reported via the second uplink channel. For example, when the UE 330 determines the beams 6 and 1 as the remaining beams, the UE 330 may report the $CQI_6$ corresponding to the beam 6 and the $CQI_1$ corresponding to the beam 1 to the BS 310 via the second uplink channel. Accordingly, the BS 310 is informed of the communication quality of the beams 6 and 1.

At Step S395, the UE 330 may report the joint PMI and the joint measurement result corresponding to the remaining beams to the BS 310 via the second uplink channel. The joint PMI and the joint measurement result are applicable in multibeam transmission. Specifically, the BS 310 may instruct the UE 330 to turn on/off the function of multibeam transmission through a signal at the PHY layer or a higher layer. When the function of multibeam transmission is turned on, the BS 310 and the UE 330 may communicate with each other by simultaneously using multiple beams. The UE 330 may recommend the BS 310 to choose a precoding matrix suitable for multibeam transmission through the joint PMI reporting. When the BS 310 receives the joint precoding matrix indicator $PMI_{6,1}$ corresponding to the beams 6 and 1 from the UE 330, the BS 310 may select a precoding matrix corresponding to the $PMI_{6,1}$ when multibeam transmission is carried out with the beams 6 and 1. In addition, when the UE 330 selects the beams 6 and 1 as the remaining beams of multibeam transmission, the UE 330 may report the joint channel quality indicator $CQI_{6,1}$ corresponding to the beams 6 and 1 to the BS 310 via the PUSCH. Accordingly, the BS 310 may be informed of the communication quality when the beams 6 and 1 are simultaneously used in the multibeam transmission.

According to the method 300 in the embodiment of the disclosure, when the BS 310 requires more beam information, the BS 310 may use the uplink grant to trigger the UE 330 to report the beam information of the remaining beams via the PUSCH. Accordingly, the BS 310 may obtain more beam information from the UE 330 to schedule beam transmission without additionally consuming the resources of the PUCCH.

Figure 4A:
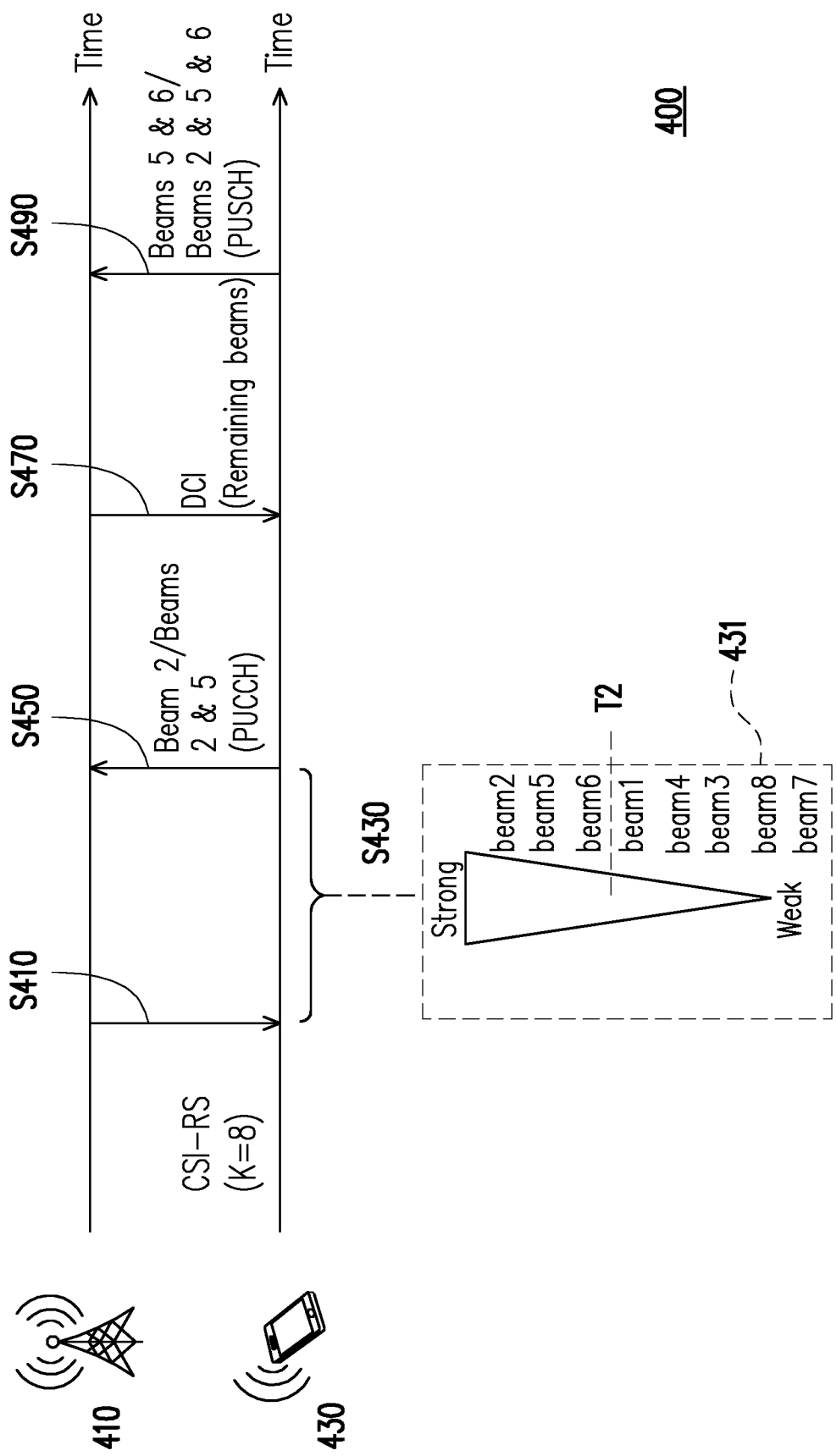
FIG. 4A is a signaling diagram of a beam measuring and reporting method according to an exemplary embodiment of the disclosure.

FIG. 4A is a signaling diagram of a beam measuring and reporting method 400 according to an exemplary embodiment of the disclosure. Specifically, at Step S410, a BS 410 may transmit a beam configuration which may comprise one or more reference signal resources for K candidate beams to a UE 430. In an exemplary, the one or more reference signal resources may further comprise K' CSI-RS resources corresponding to the K candidate beams, wherein K' may equal to or not equal to K. Accordingly, the UE 430 may perform a channel measurement for the K candidate beams based on the received beam configuration. The reference signal for the K candidate beams may be a CSI-RS and/or an SSB. However, the disclosure is not limited thereto. The BS 410 may transmit the beam configuration via a signal at a higher wireless network communication protocol layer, such as the RRC layer, the MAC layer or the like. Even though K is set at 8 in FIG. 4A, the value of K is adjustable based on practical needs. Differing from Step S210 or S310, at Step S410, the BS 410 does not transmit the configured number for instructing the UE 430 to report the number of the selected beams to the UE 430.

At Step S430, the UE 430 performs the channel measurement for each of the K candidate beams in response to receiving the beam configuration and selects O' selected beams (e.g., beams 2, 5, and 6) from the K candidate beams based on the channel measurement results. In addition, the value of O' is not determined by the BS 410, but is determined by the UE 430 on its own. The selected beams may be determined by, for example, at least one of the CSI, RSRP, and RSRQ of the candidate beams that is measured. Taking the RSRP as an example, a dotted line frame 431 in FIG. 4A represents the RSRP intensity and the threshold $T_2$ measured by the UE 430. As shown in the dotted line frame 431, in the K candidate beams received by the UE 430, the RSRP values of the beams 2, 5, and 6 exceed the threshold $T_2$. Therefore, the UE 430 may select the beams 2, 5, and 6 as the selected beams. The threshold $T_2$ may be determined by the signal at the PHY layer or a layer higher than the PHY layer and is transmitted by the BS 410 and received by the UE 430.

At Step S450, the UE 430 may report the beam information of the $O_1'$ selected beams to the BS 410 via the first uplink channel (e.g., PUCCH). In addition, the value of $O_1'$ is determined by the UE 430. In the first embodiment of FIG. 4A, the UE 430 only reports the beam information of the beam 2 to the BS 410 via the first uplink channel. In the second embodiment of FIG. 4A, the UE 430 reports the beam information of the beams 2 and 5 to the BS 410 via the first uplink channel. In addition, the UE 430 may further report the number $O_2'$ of the remaining beams to the BS 410 via the first uplink channel to inform the BS 410 that there are still $O_2'$ beams showing desirable measurement results in the channel measurement results. Therefore, the BS 410 is informed that there are $O_2'$ remaining beams available for communication with the UE 430. The UE 430 may make a decision based on the number O' of the selected beams and $O_1'$. In the first embodiment of FIG. 4A, the UE 430 may report to the BS 410 via the first uplink channel that there are still two remaining beams (i.e., the beams 5 and 6). In the second embodiment of FIG. 4A, the UE 430 may report to the BS 410 via the first uplink channel that there is still one remaining beam (i.e., the beam 6).

At Step S470, the BS 410 transmits the uplink grant to the UE 430 to thereby instruct the UE 430 to report the beam information of the remaining beams to the BS 410. For example, the BS 410 may transmit the uplink grant to the UE 430 through the DCI information, so as to instruct the UE 430 to report the beam information of the remaining beams to the BS 410 via the second uplink channel (e.g., PUSCH).

At Step S490, the UE 430 reports the beam information corresponding to the remaining beams to the BS 410 in response to receiving the uplink grant.

In the first embodiment of FIG. 4A, the UE 430 reports the beam information of the beams 5 and 6 to the BS 410 via the second uplink channel.

In the second embodiment of FIG. 4A, the UE 430 reports the beam information of the beam 6 to the BS 410 via the second uplink channel.

In addition, the UE 430 reports the joint beam information corresponding to the remaining beams to the BS 410 in response to receiving the uplink grant.

In the first embodiment of FIG. 4A, the UE 430 reports the joint beam information of the beams 5 and 6 to the BS 410 via the second uplink channel.

In the second embodiment of FIG. 4A, since the remaining beams only include the beam 6, the UE 430 may not report any joint beam information to the BS 410. However, since the UE 430 already obtains the information of the beams 2 and 5 via the first uplink channel, the UE 430 may optionally report the joint beam information associated with the beams 2 and 5 to the BS 410. For example, the UE 430 may report the joint beam information of the beams 2, 5 and 6 to the BS 410 via the second uplink channel, and the joint beam information may include the multibeam related information among the beams 2, 5, and 6.

Figure 4B:
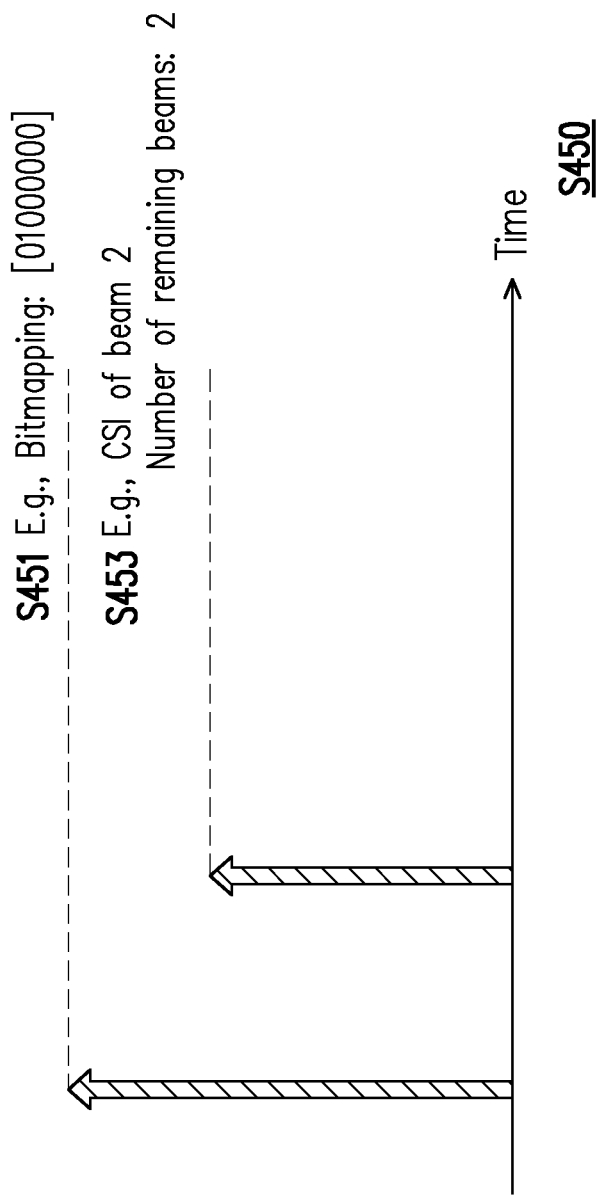
FIG. 4B is a diagram further illustrating Step S450 in a first embodiment of the method of FIG. 4A.

FIG. 4B is a diagram further illustrating Step S450 in a first embodiment of the method 400 of FIG. 4A. As shown in FIG. 4B, Step S450 in the first embodiment of the method 400 of FIG. 4A may be further divided into Steps S451 and S453.

At Step S451, the UE 430 may report the number of the selected beams and the indexes of the selected beams in the beam information to the BS 410 via the first uplink channel. For example, the UE 430 may report the number of the selected beams and the indexes of the selected beams to the BS 410 in one process through bitmapping. More specifically, the UE 430 may transmit a bit stream "01000000" to the BS 410 at Step S451. The bit stream "01000000" indicates that the UE 430 selects the beam 2 as the selected beam from the eight candidate beams. In addition, the index of the selected beam may be represented in the form of CRI.

At Step S453, the UE 430 reports the CSI of the selected beam (i.e., the beam 2) in the beam information to the BS 410 via the first uplink channel. The CSI of the selected beam may include at least one of the PMI of the selected beam and the measurement result corresponding to the selected beam. Moreover, the UE 430 may report the number "2" of the remaining beams (i.e., the beams 5 and 6) in the beam information to the BS 410 via the first uplink channel to notify the BS 410 that there are still two beams showing desirable measurement results in the channel measurement.

Figure 4C:
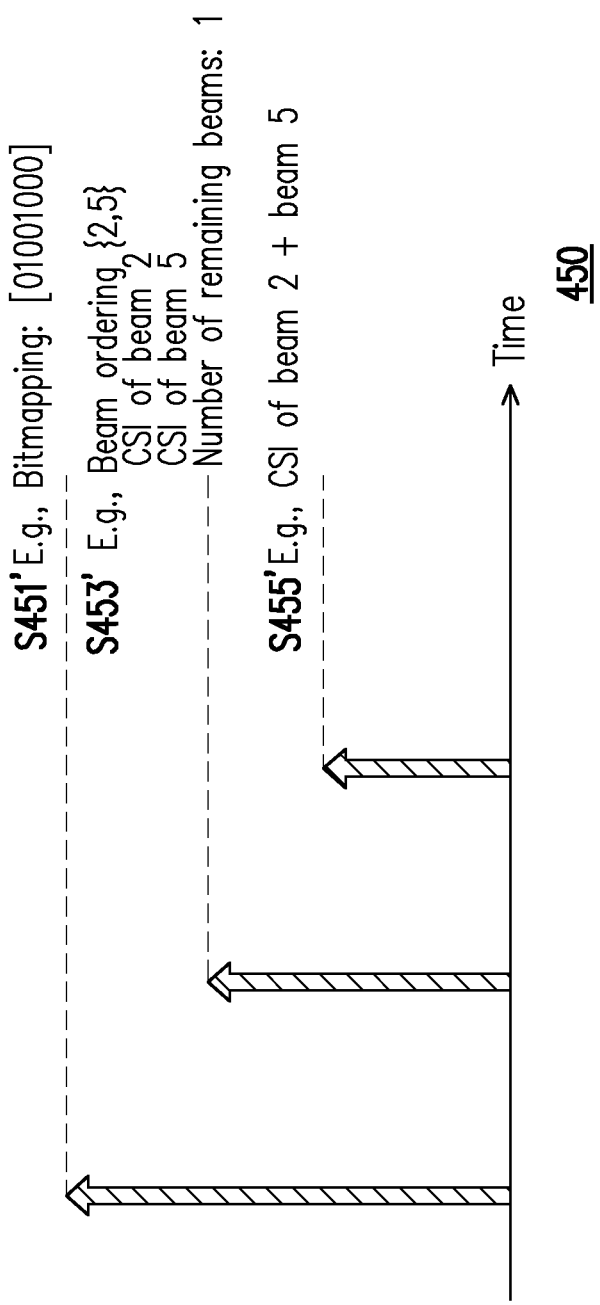
FIG. 4C is a diagram further illustrating Step S450 in the second embodiment of the method of FIG. 4A.

FIG. 4C is a diagram further illustrating Step S450 in the second embodiment of the method 400 of FIG. 4A. As shown in FIG. 4B, Step S450 in the second embodiment of the method 400 of FIG. 4A may be further divided into Steps S451', S453', and S455'.

At Step S451', the UE 430 may report the number of the selected beams and the indexes of the selected beams in the beam information to the BS 410 via the first uplink channel. For example, the UE 430 may report the number of the selected beams and the indexes of the selected beams to the BS 410 in one process through bitmapping. More specifically, the UE 430 may transmit a bit stream "01001000" to the BS 410 at Step S451. The bit stream "01001000" indicates that the UE 430 selects the beams 2 and 5 as the selected beams from the eight candidate beams. In addition, the index of the selected beam may be represented in the form of CRI.

At Step S453', the UE 430 reports the CSI of the selected beams (i.e., the beams 2 and 5) in the beam information to the BS 410 via the first uplink channel. The CSI of the selected beams may include at least one of the PMI of each of the selected beams, the beam ordering of the selected beams, and the measurement result corresponding to each of the selected beams. Moreover, the UE 430 may report the number "1" of the remaining beam (i.e., the beam 6) in the beam information to the BS 410 via the first uplink channel to notify the BS 410 that there is still one beam showing a desirable measurement result in the channel measurement.

At Step S455', the UE 430 may report the joint PMI and the joint measurement result corresponding to the selected beams to the BS 410 via the first uplink channel. The joint PMI and the joint measurement result are applicable in multibeam transmission. Specifically, the BS 410 may instruct the UE 430 to turn on/off the function of multibeam transmission through a signal at the PHY layer or a higher layer. When the function of multibeam transmission is turned on, the BS 410 and the UE 430 may communicate with each other by simultaneously using multiple beams. The UE 430 may suggest the BS 410 to choose a precoding matrix suitable for multibeam transmission through the joint PMI reporting. When the BS 410 receives the joint precoding matrix indicator $PMI_{2,5}$ corresponding to the beams 2 and 5 from the UE 430, the BS 410 may select a precoding matrix corresponding to the $PMI_{2,5}$ when multibeam transmission is carried out with the beams 2 and 5. In addition, when the UE 430 selects the beams 2 and 5 as the selected beams for multibeam transmission, the UE 430 may report the joint channel quality indicator $CQI_{2,5}$ corresponding to the beams 2 and 5 to the BS 410 via the first uplink channel. Accordingly, the BS 410 is informed of the communication quality when the beams 2 and 5 are simultaneously adopted for multibeam transmission.

The UE 430 in the method 400 of the embodiment of the disclosure may arbitrary report the rest of the remaining beams having a desirable communication quality in addition to the at least one selected beams to the BS 410 when reporting the at least one selected beam to the BS 410. When the BS 410 needs more beam information, the BS 410 only needs to trigger the UE 430 to report other beams having a desirable communication quality through the simple DCI.

Figure 5A:
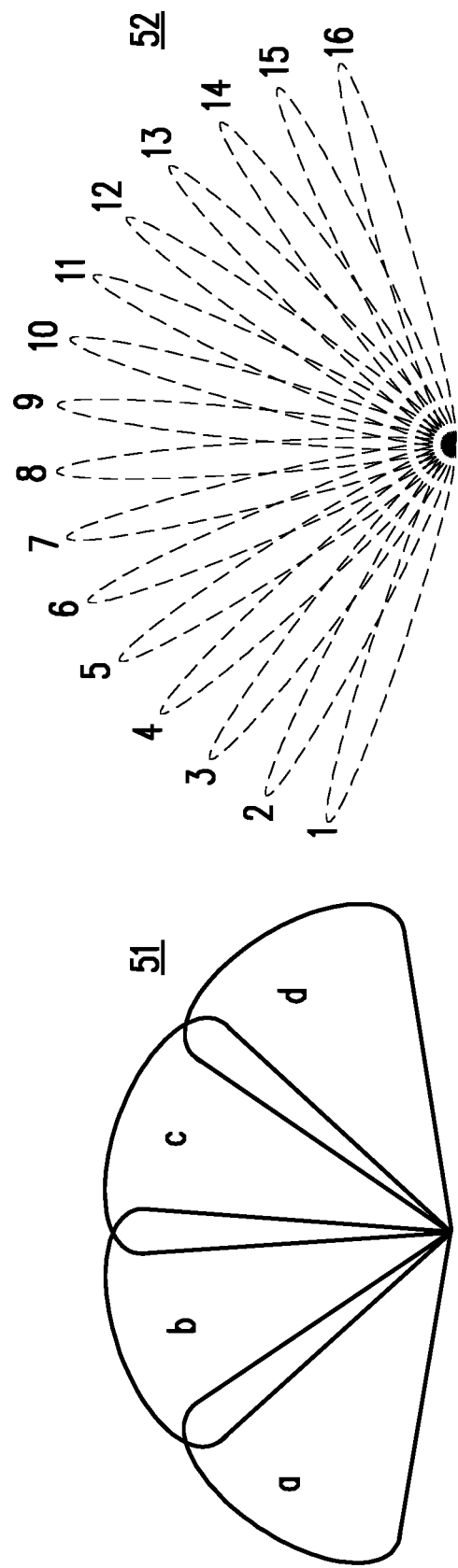
FIG. 5A is a schematic diagram illustrating different beam configurations according to an exemplary embodiment of the disclosure.

There may be a plurality of different beam configurations between the BS and the UE, and different beam configurations may have different numbers of candidate beams or different FoV coverages. In response to the mobility of the UE, the BS and the UE may adopt different beam configurations at different time points. FIG. 5A is a schematic diagram illustrating different beam configurations according to an exemplary embodiment of the disclosure. Taking FIG. 5A as an example, a BS and a UE may select a first beam configuration 51 or a second beam configuration 52 at different time points. The first beam configuration 51 may have a less candidate beam number $K_{1st}$ (relative to the second beam configuration 52). In the example of FIG. 5A, $K_{1st}$=4. The second beam configuration 52 may have a greater candidate beam number $K_{2nd}$. In the example of FIG. 5A, $K_{2nd}$=16. In addition, each of the candidate beams in the first beam configuration 51 has a broader FoV coverage, while each of the candidate beams in the second configuration 52 has a narrower FoV coverage.

In general, the BS and the UE may specify one or more specific beams in the candidate beams via the beam indexes (BI). However, as the number of candidate beams increases, the amount of data associated with the beams that need to be processed by the UE also increases. Therefore, the method according to the embodiment of the disclosure adopts a two-stage beam configuration to reduce the amount of data of the candidate beams that need to be processed at the UE.

Figure 5B:
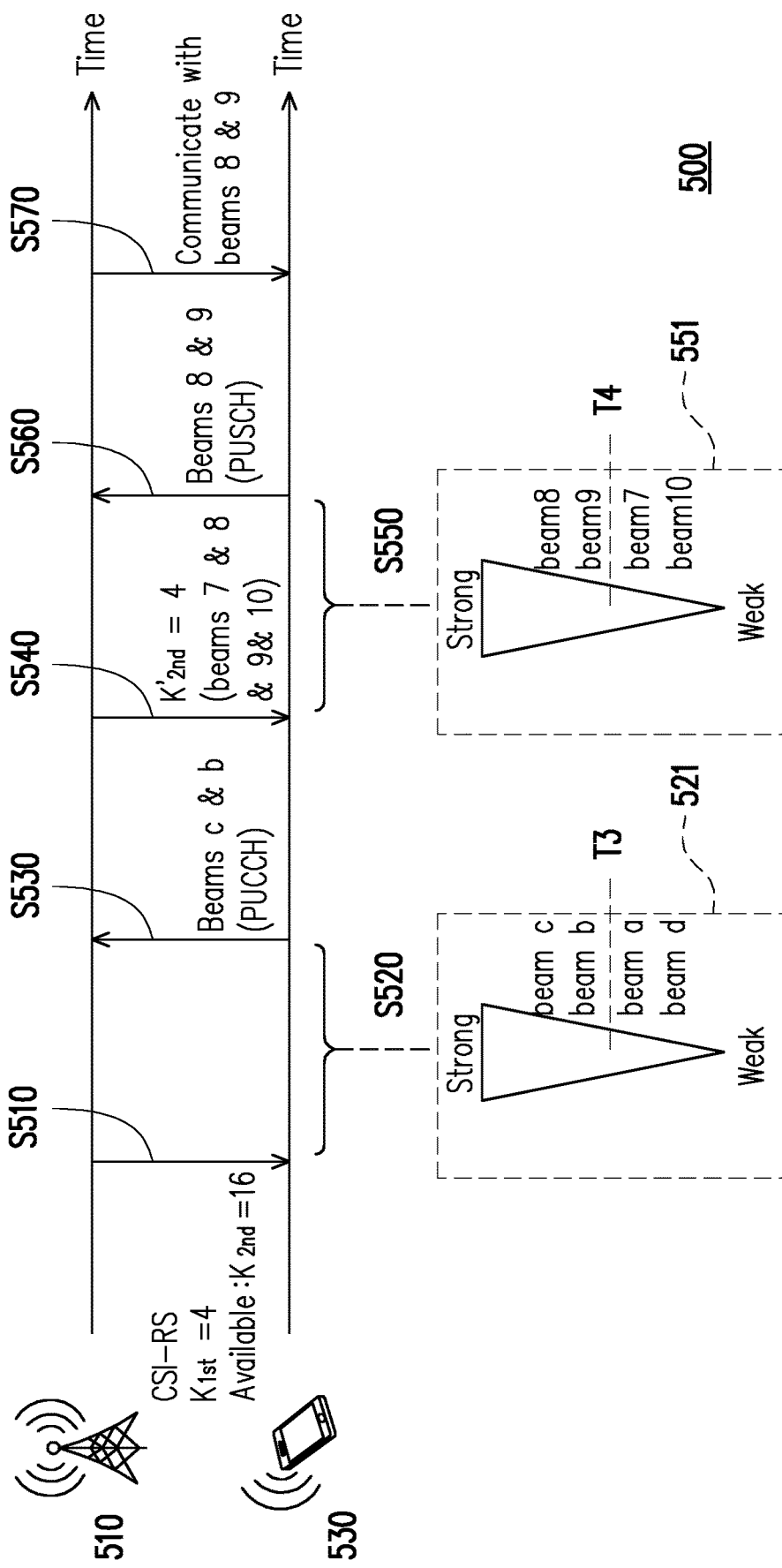
FIG. 5B is a signaling diagram of a beam measuring and reporting method 500 according to an exemplary embodiment of the disclosure.

FIG. 5B is a signaling diagram of a beam measuring and reporting method 500 according to an exemplary embodiment of the disclosure. At Step S510, a BS 510 transmits the reference signal of the $K_{1st}$ first candidate beams (as illustrated in FIG. 5A) in the first beam configuration 51 adapted for transmission at the first stage to a UE 530. Accordingly, the UE 530 may perform a channel measurement for the $K_{1st}$ first candidate beams. Moreover, the BS 510 transmits the reference signal of the $K_{2nd}$ second candidate beams (as illustrated in FIG. 5A) in the second beam configuration 52 adapted for transmission at the second stage to the UE 530. Accordingly, the UE 530 may perform a channel measurement for the $K_{2nd}$ second candidate beams.

At Step S520, the UE 530 performs a channel measurement for each of the $K_{1st}$ candidate beams and selects $N_{1st}$ first selected beams from the $K_{1st}$ first candidate beams based on the channel measurement results. A value of $N_{1st}$ may be determined by the BS 510. Specifically, the BS 510 may transmit a beam configuration to the UE 530 via a signal at a higher wireless network communication protocol layer, such as the RRC layer, the MAC layer or the like to instruct the UE 530 to report the $N_{1st}$ first selected beams. In addition, the value of $N_{1st}$ may also be determined by the UE 530 on its own.

In general, due to the mobility of the UE 530, each of the first candidate beams in the first beam configuration 51 has a broader FoV coverage. Therefore, the first candidate beams in the first beam configuration 51 has more obvious long-term statistical property with respect to the BS 510 and the UE 530. Accordingly, the UE 530 may choose to perform the channel measurement for each of the first candidate beams of the first beam configuration 51 having a fewer number of beams but a greater FoV coverage for an individual beam, so as to find out an approximate direction of a beam to be selected at a lower computation cost. In FIG. 5B, the UE 530 selects a beam c and a beam b in the first beam configuration 51 as the first selected beams based on the channel measurement results.

At Step S530, the UE 530 reports the beam information of the $N_{1st}$ first selected beams (i.e., the beams c and b) to the BS 510. The report may be transmitted via the PUCCH. The beam information of the first selected beams may include contents similar to Step S250 of FIG. 2A. As an example, the contents may include a precoding matrix indicator $PMI_c$ of the beam c, channel state information $CSI_c$ of the beam c, a precoding matrix indicator $PMI_b$ of the beam b, and channel state information $CSI_b$ of the beam b. In addition, the beam information of the first selected beams may further include a correlation among the first selected beams. The correlation among the first selected beams may assist the BS 510 to choose a candidate beam more suitable for the UE 530 from the second beam configuration 52 (as illustrated in FIG. 5A).

Figure 5C:
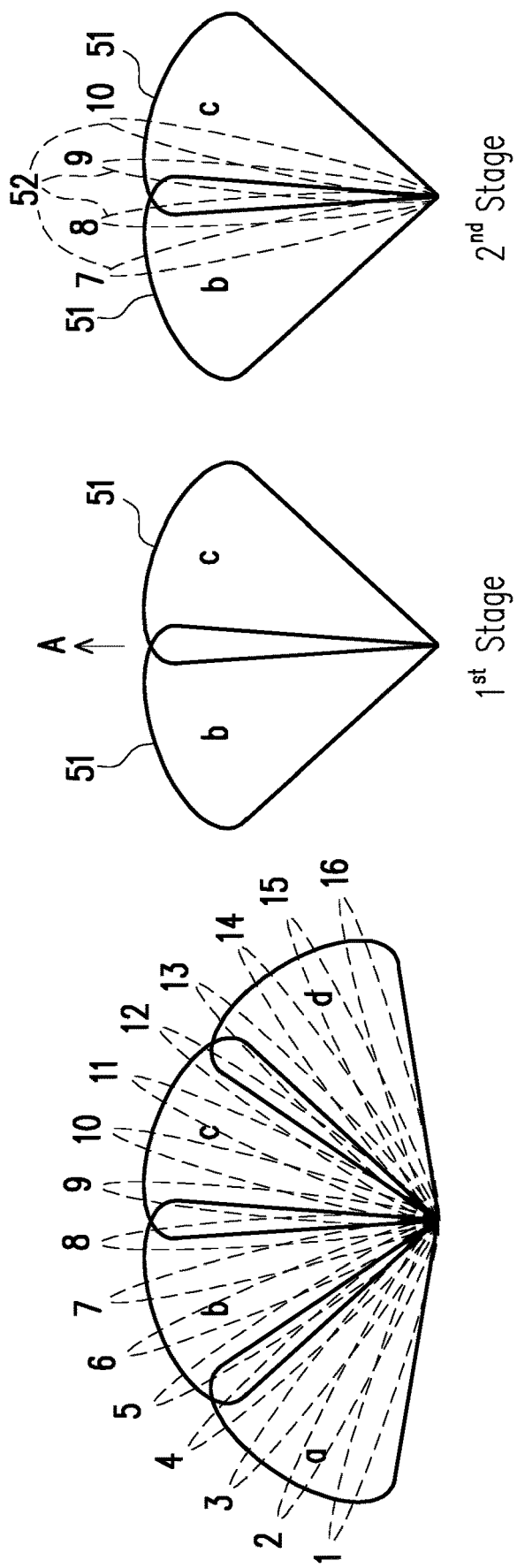
FIGS. 5C and 5D are schematic views illustrating an overlapped state between candidate beams of a first beam configuration and candidate beams of a second beam configuration according to an exemplary embodiment of the disclosure.

Referring to FIGS. 5B and 5C, FIG. 5C is a schematic view illustrating an overlapped state between the candidate beams of the first beam configuration 51 and the candidate beams of the second beam configuration 52 according to an exemplary embodiment of the disclosure.

At Step S540, based on the beam information of the first selected beams and the overlapped state, the BS 510 may select $K_{2nd}'$ second candidate beams more suitable for the UE 530 from the $K_{2nd}$ second candidate beams from the second beam configuration 52. Specifically, the BS 510 may be informed of an orientation of the UE 530 with respect to the beams b and c based on the beam information of the first selected beams. The orientation may be an orientation A shown in FIG. 5C. Accordingly, the BS 510 may choose beams (i.e., beams 7 to 10) overlapped with the first selected beams (i.e., the beams c and b) and/or closer to the orientation A as the $K_{2nd}'$ second candidate beams. In addition, the BS 510 may choose the $K_{2nd}'$ second candidate beams more suitable for the UE 530 based on the correlation among the first candidate beams. For example, if the correlation between the beams b and c is too high, the BS may choose the $K_{2nd}'$ second candidate beams from one of the beams b and c.

Figure 5D:
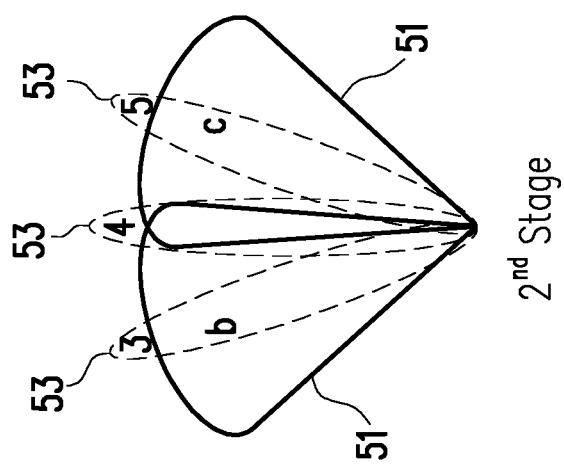
Figure 5D:
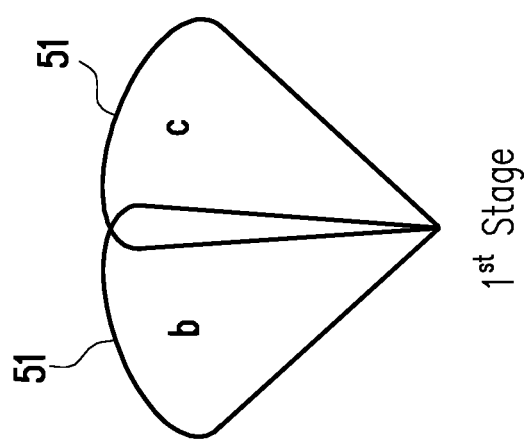
Figure 5D:
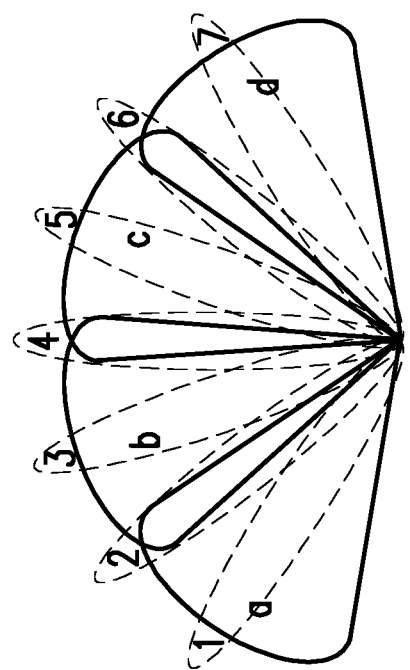

In addition to the overlapped state shown in FIG. 5C, FIG. 5D illustrates another possible overlapped state. In FIG. 5D, assuming that the second beam configuration is configured as a beam configuration 53 shown in FIG. 5D, the overlapped state may be changed. If the first selected beams are still the beams c and b, the BS 510 may choose the beams 3, 4, and 5 as the second candidate beams from the beam configuration 53. In addition, the beam 4 is respectively overlapped with the beams b and c. Besides, if the first selected beams only include the beam c, the BS 510 may also choose or not choose the beam 4 as the second candidate beam in addition to choosing the beam 5 as the second candidate beam.

In FIGS. 5B and 5C, at Step S550, the UE 530 may perform the channel measurement for each of the $K_{2nd}'$ second candidate beams, and may choose the $N_{2nd}$ second selected beams from the $K_{2nd}'$ second candidate beams based on the channel measurement results. In FIG. 5B, the UE 530 may select the beams 8 and 9 of the second beam configuration 52 as the second selected beams based on the channel measurement results.

At Step S560, the UE 530 reports the beam information of the second selected beams (i.e., the beams 8 and 9) to the BS 510. The report may be transmitted via the uplink channel (e.g., PUSCH). Since the beams 8 and 9 in the second beam configuration 52 may be respectively overlapped with the beams b and c of the first beam configuration 51, the channel properties of the beams 8 and 9 may be similar to the channel properties of the beams b and c. Specifically, the beam 8 may be quasi co-located with the beam b, and the beam 9 may be quasi co-located with the beam c. Taking the beams 8 and b as an example, if the beam 8 is not quasi co-located with the beam b, the PMI and the CSI reported by the UE 530 to the BS 510 are respectively a precoding matrix indicator $PMI_{8'}$ and channel state information $CSI_{8'}$ of the beam 8. If the beam 8 is quasi co-located with the beam b, a precoding matrix indicator $PMI_8$ or channel state information $CSI_8$ reported by the UE 530 to the BS 510 may include fewer data. In other words, the amount of data of the $PMI_8$ is less than or equal to the amount of data of $PMI_{8'}$, and the amount of data of the $CSI_8$ is less than or equal to the amount of data of the $CSI_{8'}$.

At Step S570, the BS 510 may adopt the beam 8 and/or the beam 9 of the second beam configuration to communicate with the UE 530.

The method 500 in the embodiment of the disclosure may configure the first beam configuration 51 with a fewer number of beams to the UE 530, so that the UE 530 may obtain an approximate direction of the beams for communication with the BS 510. Then, based on the first beam configuration 51, the BS 510 may select the candidate beams more suitable for the UE 530 from the second beam configuration 52 with a greater number of beams. Accordingly, the UE 530 does not need to process the data of each of the beams in the second beam configuration 52 but only processes of the data. Accordingly, the computation loading of the UE 530 may be reduced.

Figure 6A:
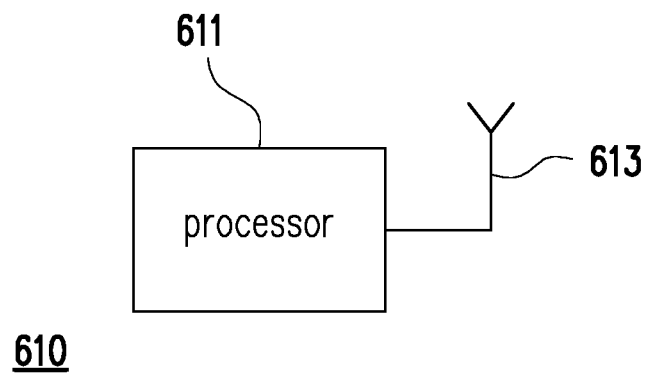
FIG. 6A is a block diagram illustrating a base station according to an exemplary embodiment of the disclosure.

FIG. 6A is a block diagram illustrating a BS 610 according to an exemplary embodiment of the disclosure. The BS 610 may include a processor 611 and a transceiver 613. The processor 611 is configured to process digital signals and carry out the function of the BS 210, the BS 310, the BS 410, or the BS 510. The function of the processor 611 may be implemented in a programmable device such as a microprocessor, a microcontroller, a digital signal processing (DSP) chip, a field programmable gate array (FPGA), or the like. The function of the processor 611 may also be implemented in an independent electronic device or an integrated circuit (IC), and the processor 611 may also be implemented in the form of hardware or software. The transceiver 613 is configured to transmit and receive wireless signals. The transceiver 613 may also carry out an operation such as low noise amplification, impedance matching, frequency mixing, up-converting or down-converting, amplification, or the like.

Figure 6B:
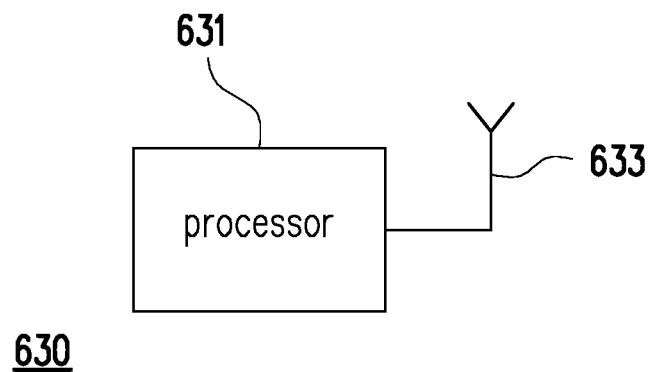
FIG. 6B is a block diagram illustrating user equipment according to an exemplary embodiment of the disclosure.

FIG. 6B is a block diagram illustrating an UE 630 according to an exemplary embodiment of the disclosure. The UE 630 may include a processor 631 and a transceiver 633. The processor 631 is configured to process digital signals and carry out the function of the UE 230, the UE 330, the UE 430, or the UE 530. The function of the processor 631 may be implemented in a programmable device such as a microprocessor, a microcontroller, a DSP chip, an FPGA, or the like. The function of the processor 631 may also be implemented in an independent electronic device or an IC, and the processor 631 may also be implemented in the form of hardware or software. The transceiver 633 is configured to transmit and receive wireless signals. The transceiver 633 may also carry out an operation such as low noise amplification, impedance matching, frequency mixing, up-converting or down-converting, amplification, or the like.

Figure 7:
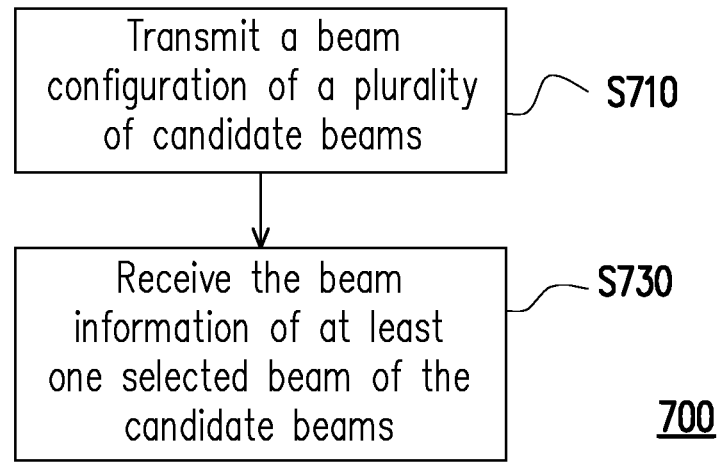
FIG. 7 is a flowchart illustrating a beam measuring and reporting method adapted for a base station according to an exemplary embodiment of the disclosure.

FIG. 7 is a flowchart 700 illustrating a beam measuring and reporting method according to an exemplary embodiment of the disclosure. The flowchart 700 is suitable for the BS 610. At Step S710, the processor 611 of the BS 610 transmits the beam configuration of a plurality of candidate beams to the UE 630 via the transceiver 613, and the UE 630 performs the channel measurement for each of the candidate beams. In response to transmitting the beam configuration, the processor 611 may receive the beam information of at least one selected beam of the candidate beams from the UE 630 via the transceiver 613 at Step S730.

Figure 8:
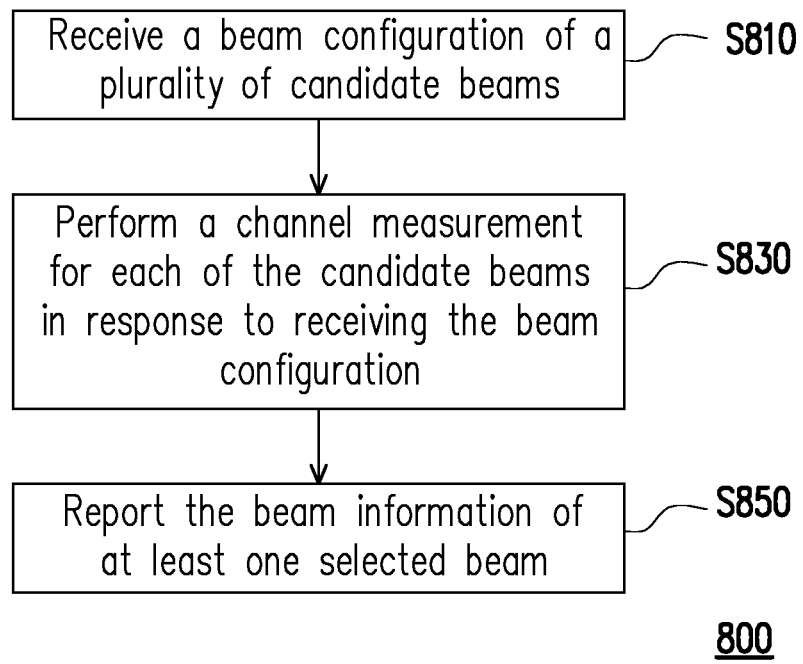
FIG. 8 is a flowchart illustrating a beam measuring and reporting method adapted for a user equipment according to an exemplary embodiment of the disclosure.

FIG. 8 is a flowchart 800 illustrating a beam measuring and reporting method according to an exemplary embodiment of the disclosure. The flowchart 800 is suitable for the UE 630. At Step S810, the processor 631 of the UE 630 receives the beam configuration of a plurality of candidate beams from the BS 610 via the transceiver 633. In response to receiving the beam configuration, the processor 631 may perform the channel measurement for each of the candidate beams via the transceiver 633 at Step S830. In response to receiving the beam configuration, the processor 631 may report the beam information of at least one selected beam to the BS 610 via the transceiver 633 at Step S850. After Step S830 and before Step S850, the processor 631 may select at least one selected beam from the selected beams based on the channel measurement results.

In view of the foregoing, through the beam configuration, the base station according to the embodiments of the disclosure may instruct on the maximum number of the selected beams reported by the user equipment via the uplink channel to control the resources consumed by the user equipment within the payload of the uplink channel when the user equipment reports the beam information of the selected beams. Moreover, with the uplink grant, the base station according to the embodiments of the disclosure may trigger the user equipment to report the beam information of the remaining beams via PUSCH to reduce the consumption of the resources of the PUCCH. Besides, the user equipment according to the embodiments of the disclosure may arbitrary report the beams with a desirable communication quality to the base station. Accordingly, when the base station needs more beam information, the base station may trigger the user equipment to report the beams with a desirable communication quality through simple DCI. Furthermore, in the embodiments of the disclosure, the two-stage beam configurations may be configured to reduce the computation loading of the user equipment.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A beam measuring and reporting method, adapted for a user equipment for a multibeam wireless communication system, comprising:
   receiving a beam configuration for a plurality of first candidate beams, wherein the beam configuration comprises a maximum number of at least one selected beam;
   performing a channel measurement for each of the first candidate beams in response to receiving the beam configuration; and
   reporting, according to the maximum number of the at least one selected beam, beam information of the at least one selected beam of the first candidate beams in response to receiving the beam configuration,
   wherein the beam information comprises at least one of the following:
   the number of the at least one selected beam;
   the number of at least one remaining beam;
   an index of the at least one selected beam;
   a precoding matrix indicator (PMI) of each of the at least one selected beam;
   a beam ordering of the at least one selected beam; and
   the measurement result corresponding to each of the at least selected beam,
   wherein the measurement result comprises at least one of the following: channel state information (CSI), reference signal received power (RSRP), and reference signal received quality (RSRQ),
   wherein the measurement result comprises a differential value determined by performing a difference operation on a value of the strongest beam in the at least one selected beam and a value of a non-strongest beam in the at least one selected beam.

2. The beam measuring and reporting method of claim 1, wherein the beam configuration comprise one or more reference signal resources.

3. The beam measuring and reporting method of claim 1, wherein the at least one selected beam determined based on at least one of the following:
   a rule associated with beam quality, comprising at least one of the following:
   a threshold;
   a correlation among the first candidate beams; and
   a predetermined value; and
   a beam ordering of the first candidate beams.

4. The beam measuring and reporting method of claim 1, wherein the maximum number of the at least one selected beam is equal to or less than the number of the first candidate beams, or equal to or greater than the number of the at least one selected beam.

5. The beam measuring and reporting method of claim 3, wherein the beam quality comprises at least one of the following: reference signal received power (RSRP), reference signal received quality (RSRQ), and channel state information (CSI).

6. The beam measuring and reporting method of claim 1, wherein the beam information further comprises at least one of the following: a joint precoding matrix indicator of the at least one selected beam and a joint measurement result of the at least one selected beam.

7. The beam measuring and reporting method of claim 1, wherein reporting the beam information of the at least selected beam further comprises:
reporting, after reporting the beam information of the at least one selected beam, second beam information corresponding to at least one remaining beam according to the at least one selected beam.

8. The beam measuring and reporting method of claim 7, wherein reporting the beam information of the at least selected beam further comprises:
receiving an uplink grant for reporting the second beam information.

9. The beam measuring and reporting method of claim 7, wherein the number of the at least one remaining beam is determined based on the maximum number of the at least one selected beam.

10. The beam measuring and reporting method of claim 7, wherein the second beam information comprises at least one of the following:
the number of the at least one remaining beam;
an index of each of the at least one remaining beam;
a precoding matrix indicator (PMI) of the at least one remaining beam;
a beam ordering of the at least one remaining beam; and
the measurement result corresponding to each of the at least one remaining beam.

11. The beam measuring and reporting method of claim 10, wherein the measurement result comprises at least one of the following: channel state information (CSI), reference signal received power (RSRP), and reference signal received quality (RSRQ).

12. The beam measuring and reporting method of claim 1, further comprising:
receiving a second beam configuration for a plurality of second candidate beams, wherein the first candidate beams are provided for a first stage transmission and the second candidate beams are provided for a second stage transmission;
performing a channel measurement for each of the second candidate beams in response to receiving the second beam configuration; and
reporting second beam information of at least one second selected beam of the second candidate beams in response to receiving the second beam configuration.

13. The beam measuring and reporting method of claim 12, wherein the second candidate beams are quasi co-located with the first candidate beams.

14. The beam measuring and reporting method of claim 12, wherein the at least one second selected beam is determined based on at least one of the following:
a rule associated with beam quality, comprising at least one of the following:
a threshold;
a correlation among the second candidate beams; and
a predetermined value; and
a beam ordering of the second candidate beams; and
a maximum number of the at least one second selected beam.

15. The beam measuring and reporting method of claim 14, wherein the maximum number of the at least one second selected beam is equal to or less than the number of the second candidate beams, or equal to or greater than the number of the at least one second selected beam.

16. The beam measuring and reporting method of claim 14, wherein the beam quality comprises at least one of the following: reference signal received power (RSRP), reference signal received quality (RSRQ), and channel state information (CSI).

17. A beam measuring and reporting method, adapted for a base station for a multibeam wireless communication system, comprising:
transmitting a beam configuration for a plurality of first candidate beams, wherein the beam configuration is transmitted to perform a channel measurement for each of the first candidate beams, and the beam configuration comprises a maximum number of at least one selected beam; and
receiving beam information of the at least one selected beam in response to transmitting the beam configuration,
wherein the beam information comprises at least one of the following:
the number of the at least one selected beam;
the number of at least one remaining beam;
an index of the at least one selected beam;
a precoding matrix indicator (PMI) of each of the at least one selected beam;
a beam ordering of the at least one selected beam; and
the measurement result corresponding to each of the at least selected beam,
wherein the measurement result comprises at least one of the following: channel state information (CSI), reference signal received power (RSRP), and reference signal received quality (RSRQ),
wherein the measurement result comprises a differential value determined by performing a difference operation on a value of the strongest beam in the at least one selected beam and a value of a non-strongest beam in the at least one selected beam.

18. The beam measuring and reporting method of claim 17, wherein the beam configuration comprise one or more reference signal resources.

19. The beam measuring and reporting method of claim 17, wherein the at least one selected beam is determined based on at least one of the following:
a rule associated with beam quality, comprising at least one of the following:
a threshold;
a correlation among the first candidate beams;
a predetermined value; and
a beam ordering of the first candidate beams.

20. The beam measuring and reporting method of claim 17, wherein the maximum number of the at least one selected beam is equal to or less than the number of the first candidate beams, or equal to or greater than the number of the at least one selected beam.

21. The beam measuring and reporting method of claim 19, wherein the beam quality comprises at least one of the following: reference signal received power (RSRP), reference signal received quality (RSRQ), and channel state information (CSI).

22. The beam measuring and reporting method of claim 17, wherein the beam information further comprises at least one of the following: a joint precoding matrix indicator of the at least one selected beam and a joint measurement result of the at least one selected beam.

23. The beam measuring and reporting method of claim 17, wherein receiving the beam information of the at least selected beam further comprises:
receiving, after receiving the beam information of the at least one selected beam, second beam information corresponding to at least one remaining beam according to the at least one selected beam.

24. The beam measuring and reporting method of claim 23, wherein receiving the beam information of the at least selected beam further comprises:
transmitting an uplink grant for reporting the second beam information.

25. The beam measuring and reporting method of claim 23, wherein the number of the at least one remaining beam is determined based on the maximum number of the at least one selected beam.

26. The beam measuring and reporting method of claim 23, wherein the second beam information comprises at least one of the following:
the number of the at least one remaining beam;
an index of the at least one remaining beam;
a precoding matrix indicator (PMI) of each of the at least one remaining beam;
a beam ordering of the at least one remaining beam; and
the measurement result corresponding to each of the at least one remaining beam.

27. The beam measuring and reporting method of claim 26, wherein the measurement result comprises at least one of the following: channel state information (CSI), reference signal received power (RSRP), and reference signal received quality (RSRQ).

28. The beam measuring and reporting method of claim 17, further comprising:
transmitting a second beam configuration for a plurality of second candidate beams, wherein the first candidate beams are provided for a first stage transmission and the second candidate beams are provided for a second stage transmission;
receiving second beam information of at least one second selected beam in response to transmitting the second beam configuration.

29. The beam measuring and reporting method of claim 28, wherein the second candidate beams are quasi co-located with the first candidate beams.

30. The beam measuring and reporting method of claim 28, wherein the at least one second selected beam is determined based on at least one of the following:
a rule associated with beam quality, comprising at least one of the following:
a threshold;
a correlation among the second candidate beams; and
a predetermined value;
a beam ordering of the second candidate beams; and
a maximum number of the at least one second selected beam.

31. The beam measuring and reporting method of claim 30, wherein the maximum number of the at least one second selected beam is equal to or less than the number of the second candidate beams, or equal to or greater than the number of the at least one second selected beam.

32. The beam measuring and reporting method of claim 30, wherein the beam quality comprises at least one of the following: reference signal received power (RSRP), reference signal received quality (RSRQ), and channel state information (CSI).

33. A user equipment, comprising:
a transceiver; and
a processor coupled to the transceiver and configured to:
receive a beam configuration for a plurality of first candidate beams via the transceiver, wherein the beam configuration comprises a maximum number of at least one selected beam;
perform a channel measurement for each of the first candidate beams in response to receiving the beam configuration; and
report, according to the maximum number of the at least one selected beam, beam information of the at least one selected beam of the first candidate beams via the transceiver in response to receiving the beam configuration,
wherein the beam information comprises at least one of the following:
the number of the at least one selected beam;
the number of at least one remaining beam;
an index of the at least one selected beam;
a precoding matrix indicator (PMI) of each of the at least one selected beam;
a beam ordering of the at least one selected beam; and
the measurement result corresponding to each of the at least selected beam,
wherein the measurement result comprises at least one of the following: channel state information (CSI), reference signal received power (RSRP), and reference signal received quality (RSRQ),
wherein the measurement result comprises a differential value determined by performing a difference operation on a value of the strongest beam in the at least one selected beam and a value of a non-strongest beam in the at least one selected beam.

34. A base station, comprising:
a transceiver; and
a processor coupled to the transceiver and configured to:
transmit a beam configuration for a plurality of first candidate beams via the transceiver, wherein the beam configuration comprises a maximum number of at least one selected beam; and
receiving beam information of the at least one selected beam via the transceiver in response to transmitting the beam configuration,
wherein the beam information comprises at least one of the following:
the number of the at least one selected beam;
the number of at least one remaining beam;
an index of the at least one selected beam;
a precoding matrix indicator (PMI) of each of the at least one selected beam;
a beam ordering of the at least one selected beam; and
the measurement result corresponding to each of the at least selected beam,
wherein the measurement result comprises at least one of the following: channel state information (CSI), reference signal received power (RSRP), and reference signal received quality (RSRQ),
wherein the measurement result comprises a differential value determined by performing a difference operation on a value of the strongest beam in the at least one selected beam and a value of a non-strongest beam in the at least one selected beam.

\* \* \* \* \*